United States Patent
Mullins et al.

(10) Patent No.: US 10,740,553 B2
(45) Date of Patent: Aug. 11, 2020

(54) COLLABORATIVE REVIEW WORKFLOW GRAPH

(71) Applicant: Microsoft Technology Licensing, LLC, Redmond, WA (US)

(72) Inventors: Christopher Mullins, Redmond, WA (US); Robert Standefer, Duvall, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 275 days.

(21) Appl. No.: 15/489,212

(22) Filed: Apr. 17, 2017

(65) Prior Publication Data
US 2018/0300304 A1    Oct. 18, 2018

(51) Int. Cl.
G06F 3/048      (2013.01)
G06F 40/186     (2020.01)
G06F 3/0485     (2013.01)
G06F 16/901     (2019.01)
G06F 16/903     (2019.01)
G06Q 10/10      (2012.01)

(52) U.S. Cl.
CPC ........ *G06F 40/186* (2020.01); *G06F 3/04855* (2013.01); *G06F 16/9024* (2019.01); *G06F 16/90335* (2019.01); *G06Q 10/10* (2013.01); *G06Q 10/101* (2013.01); *G06Q 10/103* (2013.01)

(58) Field of Classification Search
CPC ..... G06Q 10/10; G06F 17/24; G06F 17/2288; G06F 17/212
See application file for complete search history.

(56) References Cited

U.S. PATENT DOCUMENTS 8,190,459 B1 *   5/2012   Fong ............... G06Q 10/063
                                                  705/7.11
8,543,647 B2     9/2013   Cheng et al.
(Continued)

FOREIGN PATENT DOCUMENTS

WO   2014055706 A1   4/2014

OTHER PUBLICATIONS

"PleaseReview", http://www.pleasetech.com/pleasereview.aspx, Published on: 2015, 2 pages.
(Continued)

*Primary Examiner* — Haoshian Shih

(57) ABSTRACT

A review workflow graph (e.g., graph database) is provided that is a graphical representation of a review workflow assigned to a document and/or an individual document section. In particular, contents of the document may be stored as nodes in the review workflow graph. As the reviewers perform the review workflow, results associated with one or more review processes may be recorded and stored in the review workflow graph with relationships to the content nodes. In aspects, the graph of nodes may be materialized into a view of the document and/or a review timeline. For instance, portions of the document that have been completed may be materialized, but content that is not yet complete (e.g., reached a milestone) may not be materialized. Additionally, the review timeline may be a visual or other representation of the temporal progress of the review workflow, including intermediate milestones as well as an ultimate completion deadline.

20 Claims, 15 Drawing Sheets

(56) References Cited

U.S. PATENT DOCUMENTS

| | | |
|---|---|---|
| 8,655,004 B2 | 2/2014 | Prest et al. |
| 10,127,215 B2 * | 11/2018 | Siwoff ................ G06F 17/2288 |
| 2006/0282762 A1 | 12/2006 | Diamond et al. |
| 2009/0049108 A1 | 2/2009 | Forde et al. |
| 2009/0235181 A1 * | 9/2009 | Saliba .................... G06Q 10/10 715/753 |
| 2009/0241048 A1 | 9/2009 | Augustine et al. |
| 2013/0085811 A1 * | 4/2013 | Darden ................ G06Q 10/00 705/7.38 |
| 2013/0262373 A1 | 10/2013 | Rampson |
| 2013/0283147 A1 | 10/2013 | Wong et al. |
| 2014/0032780 A1 | 1/2014 | Swineford et al. |
| 2014/0033088 A1 * | 1/2014 | Shaver .................. G06F 17/212 715/764 |
| 2014/0172787 A1 | 6/2014 | Greenberg et al. |
| 2014/0201131 A1 | 7/2014 | Burman et al. |
| 2014/0281872 A1 | 9/2014 | Glover |
| 2014/0298198 A1 * | 10/2014 | Kuchibhotla ........... G06F 17/24 715/753 |
| 2015/0254791 A1 | 9/2015 | Stockton |
| 2016/0140499 A1 | 5/2016 | Mitti et al. |
| 2016/0180033 A1 * | 6/2016 | Rosenberg ............ G06F 19/328 705/2 |
| 2016/0342665 A1 | 11/2016 | Lane et al. |

OTHER PUBLICATIONS

"Alfresco or Documentum Collaborative Document Reviews with OpenAnnotate", http://www.tsgrp.com/2014/12/18/alfresco-or-documentum-collaborative-document-reviews-with-openannotate/, Published on: Dec. 18, 2014, 3 pages.

"International Search Report and Written Opinion Issued in PCT Application No. PCT/US2018/026350", dated Jun. 19, 2018, 11 pages.

* cited by examiner

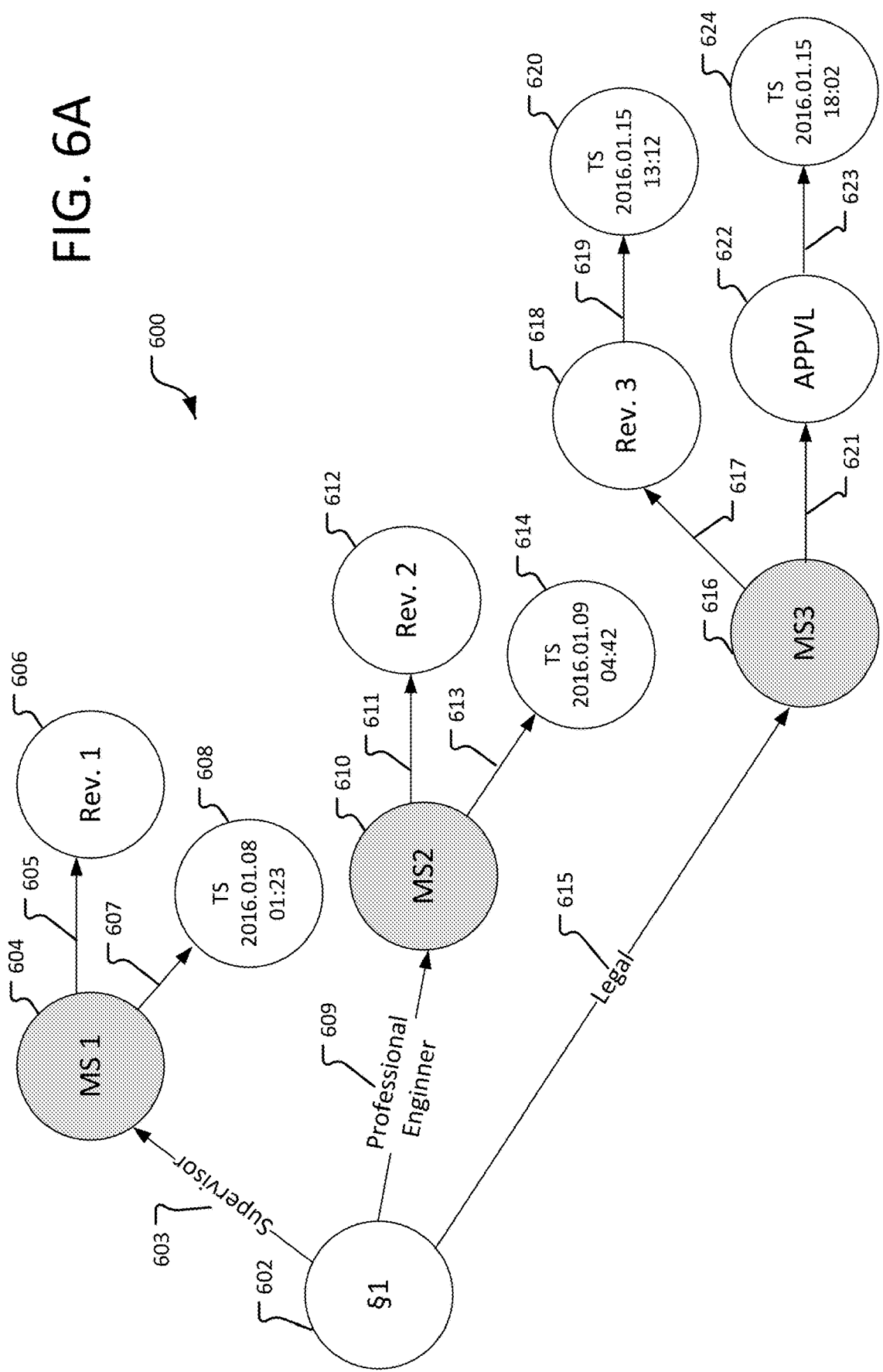

COLLABORATIVE REVIEW WORKFLOW GRAPH

BACKGROUND

Document review workflow has existed in content management systems for many years. Various systems implement workflows in different ways, typically incorporating features for gating workflows based on approvals. The existing systems use approvals at the document level, meaning that the document as a whole must be approved before the review workflow can continue. In some cases, the existing systems use metadata, which a user or an application can associate with the document based on various conditions. In this way, coauthors are able to see a summary of changes made by other users, e.g., by alternative font colors, comments and/or tracked changes. However, existing systems do not adequately address document review workflows based on individual portions of documents, among other things. Source code control systems also implement review workflows based on approvals. Similarly, the source code as a whole must be approved before the review workflow can continue. Source code control systems have some limited mechanisms for saying, "You've got an outstanding code review." However, such systems are unable to focus on particular portions of the source code to ask questions such as, "Did you review function convertDateToEpoch( )?" Thus, other communication tools and mediums have been developed and relied on by collaborators to coordinate and comment on changes, e.g., such as instant messaging (IM), short message service (SMS), Yammer, Skype, SharePoint, etc. However, these communication tools add complexity rather than improving the implementation of document review workflows.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

This summary is provided to introduce a selection of concepts in a simplified form that are further described below in the Detail Description section. This summary is not intended to identify key features or essential features of the claimed subject matter, nor is it intended to be used as an aid in determining the scope of the claimed subject matter.

In an aspect, a system including a processor and a memory is provided. The memory stores instructions that when executed by the processor cause the system to perform a set of operations including assigning a review workflow to at least one document section of a document. The operations further include monitoring the review workflow over time, where the review workflow is associated with one or more review events, and associating at least one review event with a timeline associated with the at least one document section. Additionally, the operations include providing the timeline.

In another aspect, a computer-implemented method is provided. The method for generating a graph of a review workflow assigned to at least one section of a document. The method including generating a first node of a graph, where the first node includes content of the at least one document section, and receiving a review event, where the review event is associated with a review workflow assigned to the at least one document section. The method further including generating a second node of the graph, where the second node includes review data associated with the review event. Additionally, based at least in part on the review workflow, the method includes determining a relationship between the first node and the second node of the graph and querying the graph to identify a status of the review workflow.

In yet another aspect, a computer storage medium including computer-executable instructions is provided. The computer-executable instructions, when executed by a processor, perform a method for generating a graph of a review workflow assigned to at least one section of a document. The method includes generating a first node of a graph, where the first node includes content of the at least one document section, and receiving a review event at a first time, where the review event is associated with a review workflow assigned to the at least one document section. The method further includes generating a second node of the graph, where the second node includes the first time and review data associated with the review event. Based at least in part on the review workflow, the method also includes determining a relationship between the first node and the second node of the graph and querying the graph to generate a timeline of the review workflow assigned to the at least one document section.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 6A depicts a first example review workflow graph associated with a document section.

DETAILED DESCRIPTION

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

The present disclosure relates to systems and methods for providing a review workflow graph (e.g., graph database) that is a graphical representation of a review workflow assigned to a document and/or an individual document section. In particular, contents of the document may be stored as nodes in the review workflow graph. A node may correspond to a section of the document, e.g., a paragraph, a sentence, a word, a character, a number, a cell, a range of cells, a slide, a frame, etc. As the reviewers perform the review workflow, results associated with one or more review processes may be recorded and stored in the review workflow graph with relationships to the content nodes. Results of the review processes may include but are not limited to an edit to a document section, an approval or disapproval of a document section, a comment regarding a document section, a read status of a document section (e.g., an extent a document section has been read by a process owner), a state of a document section (e.g., complete, in-progress, not started yet, etc.), an incremented version of a document section, and the like. In aspects, the graph of nodes may be materialized into a view of the document, a review timeline and/or any other manifestation of the graph (e.g., set of reviewers, set of processes and/or set of rules assigned to a particular document section or sections, and the like). For instance, portions of the document that have been completed may be materialized, but content that is not yet complete (e.g., reached a milestone) may not be materialized. Additionally, the review timeline may be a visual representation of the temporal progress of the review workflow, including intermediate milestones as well as an ultimate completion deadline. In some cases, other representations (e.g., audio, tactile, high contrast, etc.) of a review timeline may be provided (e.g., for visually impaired users).

Figure 1:
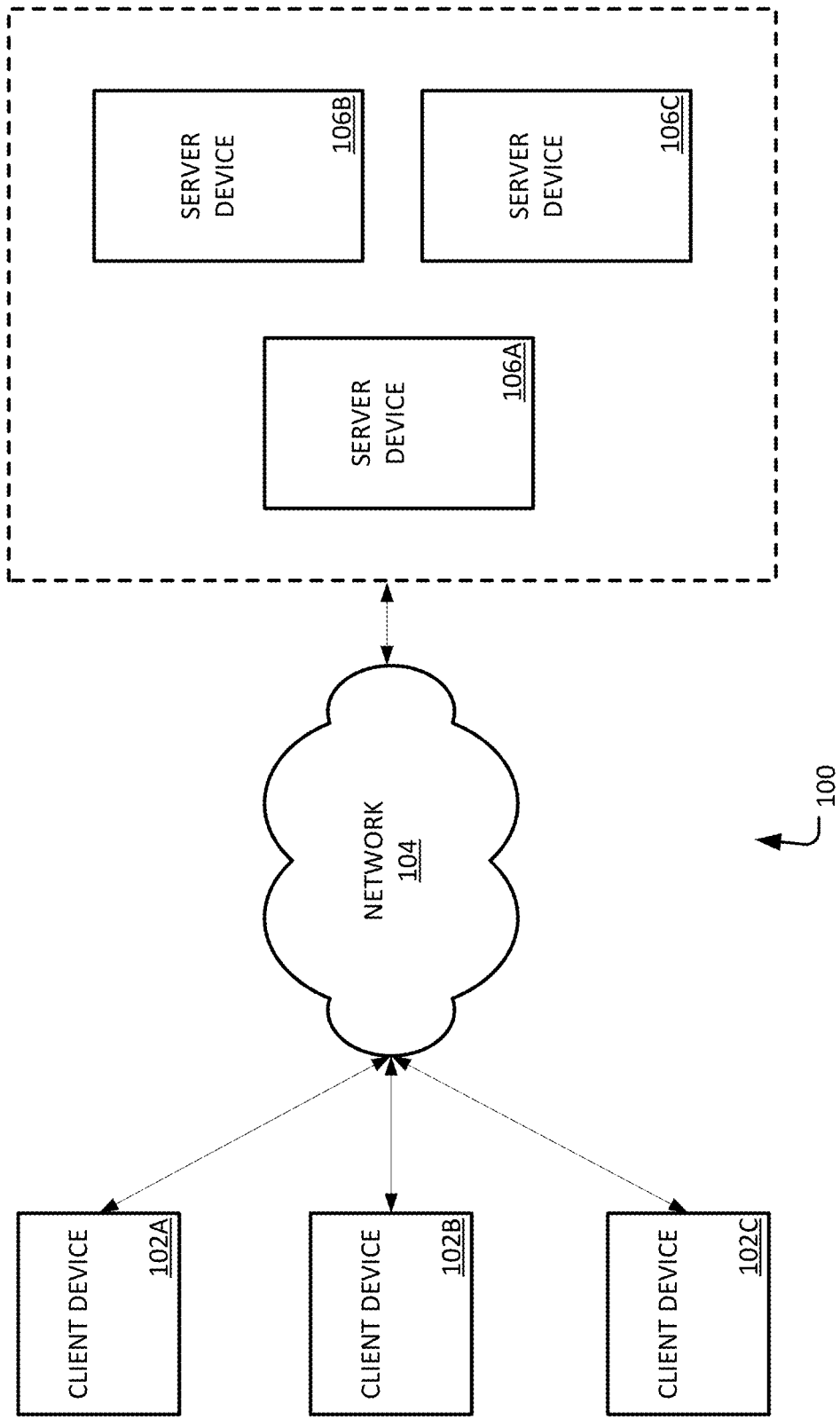
FIG. 1 illustrates an overview of a first example system for generating a review workflow graph of a collaborative document.

FIG. 1 illustrates an overview of a first example system for generating and utilizing a review workflow graph of a collaborative document. Example system 100 may be a combination of interdependent components that interact to form an integrated whole for generating a review workflow graph of a collaborative document. In aspects, system 100 may include hardware components (e.g., used to execute/run an operating system (OS)), and/or software components (e.g., applications, application programming interfaces (APIs), modules, virtual machines, runtime libraries, etc.) running on hardware. In particular aspects, system 100 may provide an environment for software components to execute, evaluate operational constraint sets, and utilize resources or facilities of the system 100. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 10-13. In other instances, the components of systems disclosed herein may be distributed across and executable by multiple devices. For example, input may be entered on a client device and information may be processed or accessed from other devices in a network (e.g. server devices, network appliances, other client devices, etc.).

As presented, system 100 comprises client devices 102A-C, distributed network 104, and a distributed server environment comprising one or more servers, such as server devices 106A-C. One of skill in the art will appreciate that the scale of systems such as system 100 may vary and may include additional or fewer components than those described in FIG. 1. In some aspects, interfacing between components of the system 100 may occur remotely, for example, where components of system 100 may be distributed across one or more devices of a distributed network.

In aspects, client devices 102A-C may be configured to receive input via a user interface component or other input means. Examples of input may include voice, visual, touch and text input. The interface component may enable the creation, modification and navigation of various datasets and graphical representations. In examples, the various datasets may comprise (or be otherwise associated with), for example, review workflows assigned to collaborative documents, as discussed in further detail below. As used herein, a "review workflow" refers to one or more review processes through which one or more sections of a document pass from initiation to completion. The one or more review processes may be assigned to one or more "process owners," which may include but are not limited to, for example, developers, administrators, managers, supervisors, legal personnel, engineering personnel, copy editors, automated review bots, and the like. When action is taken by a process owner on a review process, this may be referred to as a "review event" and the results and/or relationships associated with a review event may be referred to herein as "review data." Review data may include but is not limited to, for example, an edit to a document section, an approval or disapproval of a document section, a comment regarding a document section, a read status of a document section (e.g., an extent a document section has been read by a process owner), a state of a document section (e.g., complete, in-progress, not started yet, etc.), an incremented version of a document section, and the like. As used herein, a "document" refers to any collection of data, including but not limited to a word-processing document, a workbook, a worksheet, a presentation document, a collection of code (e.g., strings, arrays, objects, etc.), a log, a report, a chart, an image, a video, etc.; and a "document section" may refer to any subset of a collection of data, including but not limited to a paragraph, a sentence, a word, a character, a number, a cell, a range of cells, a slide, a frame, etc. A "collaborative document" refers to any document accessible to more than one user.

Generally, the datasets are stored on one or more server devices 106A-C and are accessible by the client devices 102A-C. In some examples, however, the datasets may be at least partially stored on one or more of the client devices 102A-C. The underlying review data represented in the various datasets (or collections) may be stored locally or in a data store, such as a cloud storage application, accessible to client devices 102A-C. In at least one example, the underlying review data represented in the various collections (or portions thereof) may be distributed across client devices 102A-C. For instance, client device 102A (e.g., a mobile phone) may locally store a first portion of the review data represented in the collection, client device 102B (e.g., a tablet) may locally store a second portion of the review data, and client device 102C (e.g., a laptop) may locally store the remaining portion of the review data represented in the collection. In examples, the client devices 102A-C may have access to all of the review data included in the collection, may have access to a subset of the review data included in the collection, or, alternatively, may not have access to any of the review data included in the collection.

As should be appreciated, the various devices, components, etc., described with respect to FIG. 1 are not intended to limit the systems and methods to the particular components described. Accordingly, additional topology configurations may be used to practice the methods and systems herein and/or some components described may be excluded without departing from the methods and systems disclosed herein.

Figure 2:
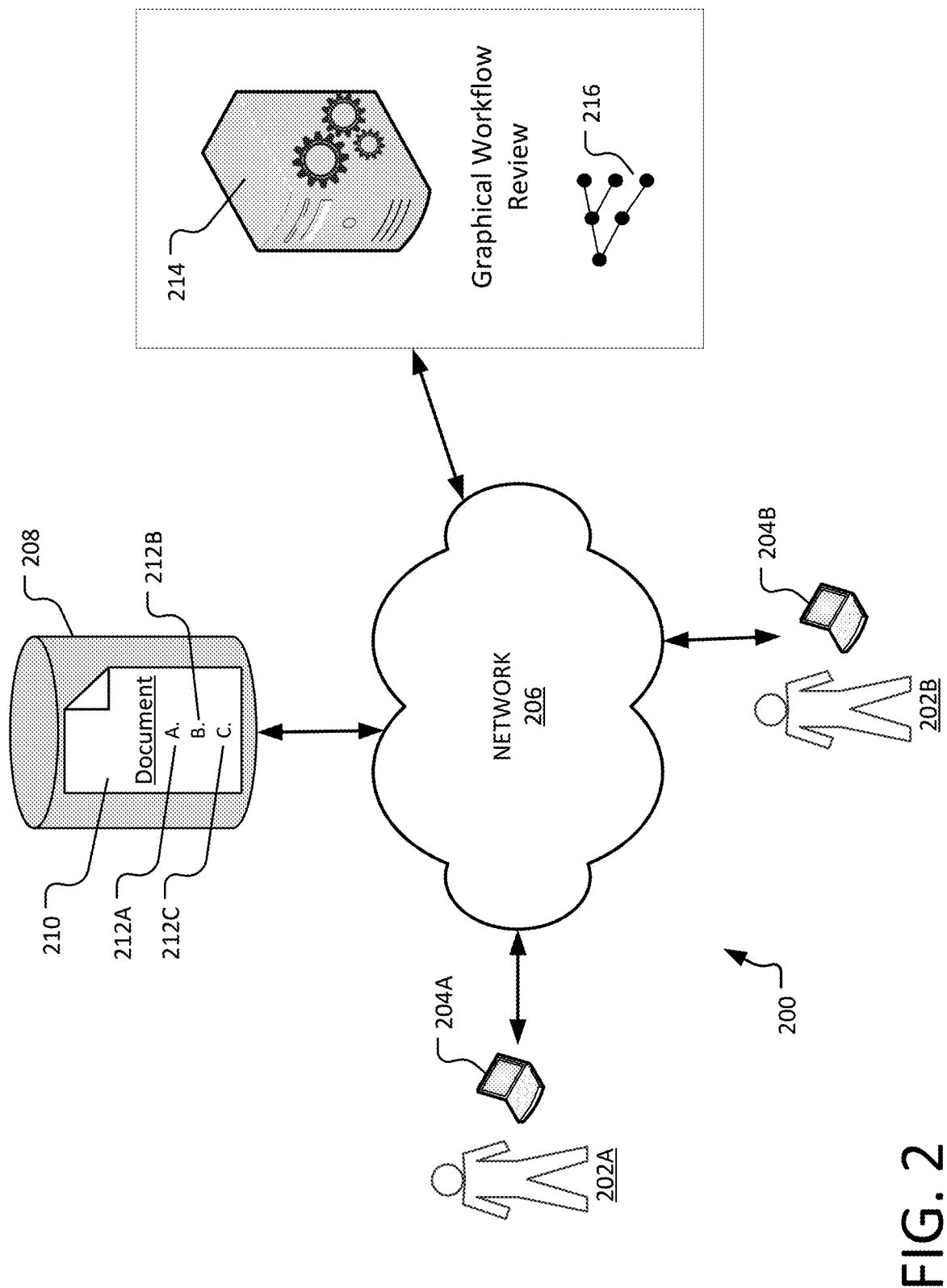
FIG. 2 illustrates an overview of a second example system for generating a review workflow graph of a collaborative document.

FIG. 2 illustrates an overview of a second example system for generating and utilizing a review workflow graph of a collaborative document. Similar to example system 100, example system 200 may be a combination of interdependent components that interact to generate and utilize a review workflow graph of a collaborative document. In aspects, system 200 may include hardware components (e.g., used to execute/run an operating system (OS)), and/or software components (e.g., applications, application programming interfaces (APIs), modules, virtual machines, runtime libraries, etc.) running on hardware. In particular aspects, system 200 may provide an environment for software components to execute, evaluate operational constraint sets, and utilize resources or facilities of the system 200. In such aspects, the environment may include, or be installed on, one or more processing devices. For instance, software (e.g., applications, operational instructions, modules, etc.) may be run on a processing device such as a computer, mobile device (e.g., smartphone/phone, tablet, laptop, personal digital assistant (PDA), etc.) and/or any other electronic device. As an example of a processing device operating environment, refer to the exemplary operating environments depicted in FIGS. 10-13. In other instances, the components of systems disclosed herein may be distributed across and executable by multiple devices. For example, input may be entered on a client device and information may be processed or accessed from other devices in a network (e.g. server devices, network appliances, other client devices, etc.).

As illustrated, system 200 may include one or more client computing devices 204 that may access a graphical review workflow application. In some examples, a client graphical review workflow application may execute locally on a client computing device 204A and/or a client computing device 204B. In other examples, a client graphical review workflow application (e.g., a mobile app on a thin client computing device 204A or 204B) may operate in communication (e.g., via network 206) with a corresponding server version of a graphical review workflow application executing on one or more server computing devices, e.g., server computing device 214. In still other aspects, rather than executing a client version of a graphical review workflow application, the one or more client computing devices 204A and/or 204B may remotely access, e.g., over network 206, the graphical review workflow application implemented on one or more server computing devices (e.g., in a distributed computing environment such as a cloud-computing environment). In aspects, the graphical review workflow application, whether executed on a client, a server, or in a cloud-computing environment, may be integrated into or in communication with a collaborative document application for sharing one or more documents. The a collaborative document application may execute on server computing device 214, client computing devices 204A and/or 204B, and/or on one or more other server computing devices (not shown).

In a basic configuration, client computing device 204A and/or client computing device 204B are personal or handheld computers having both input elements and output elements operated by one or more users (e.g., user 202A and user 202B). In some instances, users 202A and/or 202B may be developers, administrators, managers, supervisors, legal personnel, engineering personnel, copy editors, or other authorized user. For example, the one or more client computing devices 204A and/or 204B may include one or more of: a mobile telephone; a smart phone; a tablet; a phablet; a smart watch; a wearable computer; a personal computer; a desktop computer; a laptop computer; a television; and the like. This list is exemplary only and should not be considered as limiting. Any suitable client computing device for executing a graphical review workflow application and/or remotely accessing a graphical review workflow application may be utilized.

In some aspects, network 206 is a computer network such as an enterprise intranet and/or the Internet. In this regard, the network 206 may include a Local Area Network (LAN), a Wide Area Network (WAN), the Internet, wireless and wired transmission mediums. In further aspects, a server computing device (e.g., server computing device 214) may communicate with some components of the system via a local network (e.g., an enterprise intranet), whereas server computing device 214 may communicate with other components of the system via a wide area network (e.g., the Internet). In addition, the aspects and functionalities described herein may operate over distributed systems (e.g., cloud-computing systems), where application functionality, memory, data storage and retrieval, and various processing functions may be operated remotely from each other over a distributed computing network, such as the Internet or an intranet.

System 200 may further include storage 208. Storage 208 may be accessible to client computing devices 204A and/or 204B, the graphical review workflow application, a collaborative document application, one or more server computing devices (e.g., server computing device 214), etc. Storage 208 may be located in a single location or may be distributed over many locations. As illustrated, storage 208 stores one or more documents 210, which may further include one or more document sections 212 (e.g., document 210 includes document section 212A, document section 212B, document section 212C, etc.). As detailed above, a document 210 may be any collection of data and a document section 212 of a document 210 may be any subset of the collection of data. Additionally, storage 208 or other storage (not shown) may store review data including results and/or relationships associated with the one or more review processes assigned to a document 210 and/or a document section 212.

Server computing device 214 may represent any number of server computing devices, from a single server computing device to multiple server computing devices communicating over any local or wide area network, including a cloud-computing environment with distributed data storage, memory and/or processing components. As illustrated, server computing device 214 may execute a graphical review workflow application for creating and/or utilizing a review workflow graph 216. Review workflow graph 216 (e.g., graph database) may be a graphical representation of a document and the review data associated with one or more review processes assigned to the document and/or sections of the document. In particular, contents of the document may be stored as nodes in the review workflow graph 216. A node may correspond to a section of the document, such as a paragraph, a sentence, a word, a character, a number, a cell, a range of cells, a slide, a frame, etc. In aspects, the graph of nodes may be materialized into a view (e.g., a document) when a "document mode" is selected. In this case, because the contents of the document are nodes, the review workflow (e.g., one or more review processes) may act upon the nodes and their relationships rather than on the document as a whole. Additionally, server computing device 214 may execute or be in communication with a collaborative document application (not shown) for generating, manipulating and/or sharing the document. In aspects, the graphical review workflow application may execute in conjunction with or may include the collaborative document application.

As should be appreciated, the various methods, devices, components, etc., described with respect to FIG. 2 are not intended to limit the systems and methods to the particular components described. Accordingly, additional topology configurations may be used to practice the methods and systems herein and/or some components described may be excluded without departing from the methods and systems disclosed herein.

Figure 3:
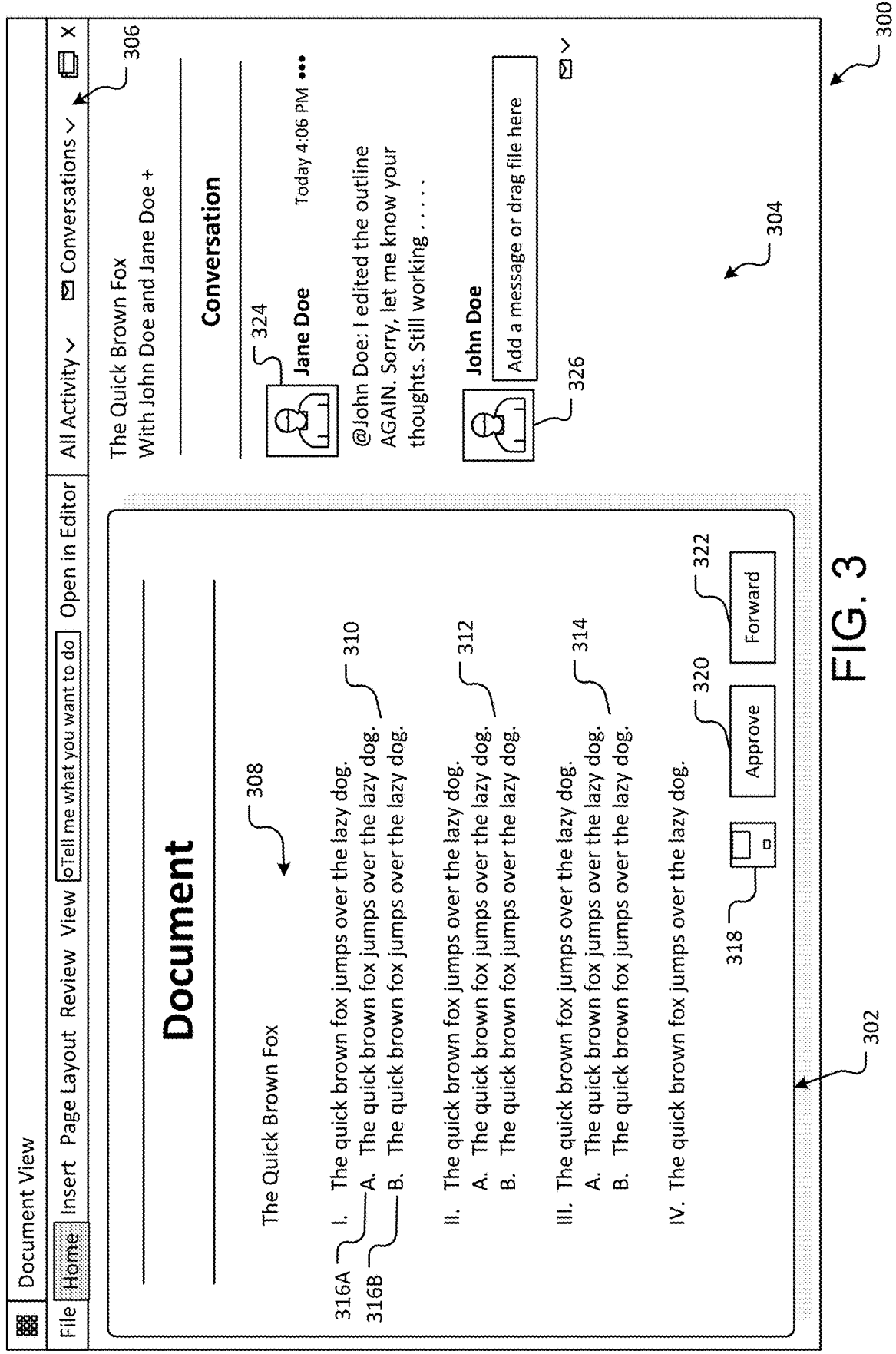
FIG. 3 illustrates an example interface associated with a collaborative document application.

FIG. 3 illustrates an example interface associated with a collaborative document application.

As detailed above, a collaborative document application may provide for generating, manipulating and/or sharing a document among coauthors, etc. In some aspects, a collaborative document application may provide a document interface 300 with one or more windows, panes, ribbons, toolbars, input fields, etc., for interacting with the document and/or other collaborators. As illustrated, the document interface 300 includes a document pane 302, a conversation pane 304, and a toolbar 306. In aspects, document interface 300 may be associated with a "document mode" (or "document view") of a graphical review workflow application. In other aspects, a document view associated with a graphical review workflow application may be more robust than document interface 300 and may provide access to and/or the status of a review workflow (e.g., via a review timeline) associated with document 308.

In aspects, document pane 302 may provide a canvas for inputting a document 308 (e.g., read/write access), e.g., by typing on a virtual or physical keyboard, drawing on a touch-sensitive display screen (e.g., using a handwriting-to-text converter), speaking into a microphone (e.g., using a speech-to-text converter), copy/pasting text from another document, and the like. Document pane 302 may further provide read access to a document 308 for viewing the document 308. In aspects, document 308 may include one or more document sections. For instance, document 308 may include document section 310, document section 312 and document section 314. As detailed above, a document section may correspond to a paragraph, a sentence, a word, a character, etc. In the illustrated case, each document section (e.g., document sections 310, 312 and 314) corresponds to a top-level section of an outline. Additionally, document section 310 is further divided into document subsection 316A and document subsection 316B. In this case, each document subsection (e.g., document subsections 316A and 316B) corresponds to a second-level section of an outline. As should be appreciated, document 308 may be partitioned into document sections, document subsections, or any other subset of data or content within the document.

In aspects, the collaborative document application may allow access to the document 308 to more than one user. That is, more than one user may "coauthor" a single instance of document 308 at substantially the same time. In aspects, the single instance of document 308 may be a current version of the document 308 synchronized or updated in near real time with authoring events from all active coauthors. Coauthoring the document 308 may include performing authoring events such as adding content, deleting content, changing content, adding formatting, changing formatting, adding comments, deleting comments, changing comments, and the like. During a review workflow, various reviewers (e.g., process owners) may perform authoring events to revise the document. When changes are made to a document, a version of the document may be incremented and/or the document may be saved as "revision #." In aspects, document interface 300 may include one or more controls for performing the authoring actions in the version of the document 308. As illustrated, the document pane 302 may include a save control 318 for saving the version of the document, a approve control 320 for approving the document and/or a forward control 322 for forwarding the document to another coauthor. In some cases, when the approve control 320 is activated, a time may be logged as a timestamp and associated with a milestone. In aspects, a timestamp may include a calendar date (e.g., YYYY/MM/DD), an hour designation (in 12 hour or 24 hour format), a minute designation, a second designation, a decisecond designation, and the like.

In further aspects, document interface 300 of the collaborative document application may provide a conversation pane 304 for communicating between coauthors of the document 308. In the illustrated case, coauthor 324 (e.g., "Jane Doe") sent a message to coauthor 326 (e.g., "John Doe") regarding additional edits made to the document. As should be appreciated, conversation pane 304 may be replaced with a comment pane (not shown) in which coauthors may insert comments to particular sections of the document 308. Other examples are possible and document interface 300 may be configured in any suitable manner to allow coauthors to communicate and substantially simultaneously manipulate a single instance of a document.

As should be appreciated, the various features and functionalities of document interface 300 described with respect to FIG. 3 are not intended to limit associated systems and methods to the particular features and functionalities described. Accordingly, additional features and functionalities may be included and/or some features and functionalities described may be excluded without departing from the disclosure provided herein.

Figure 4:
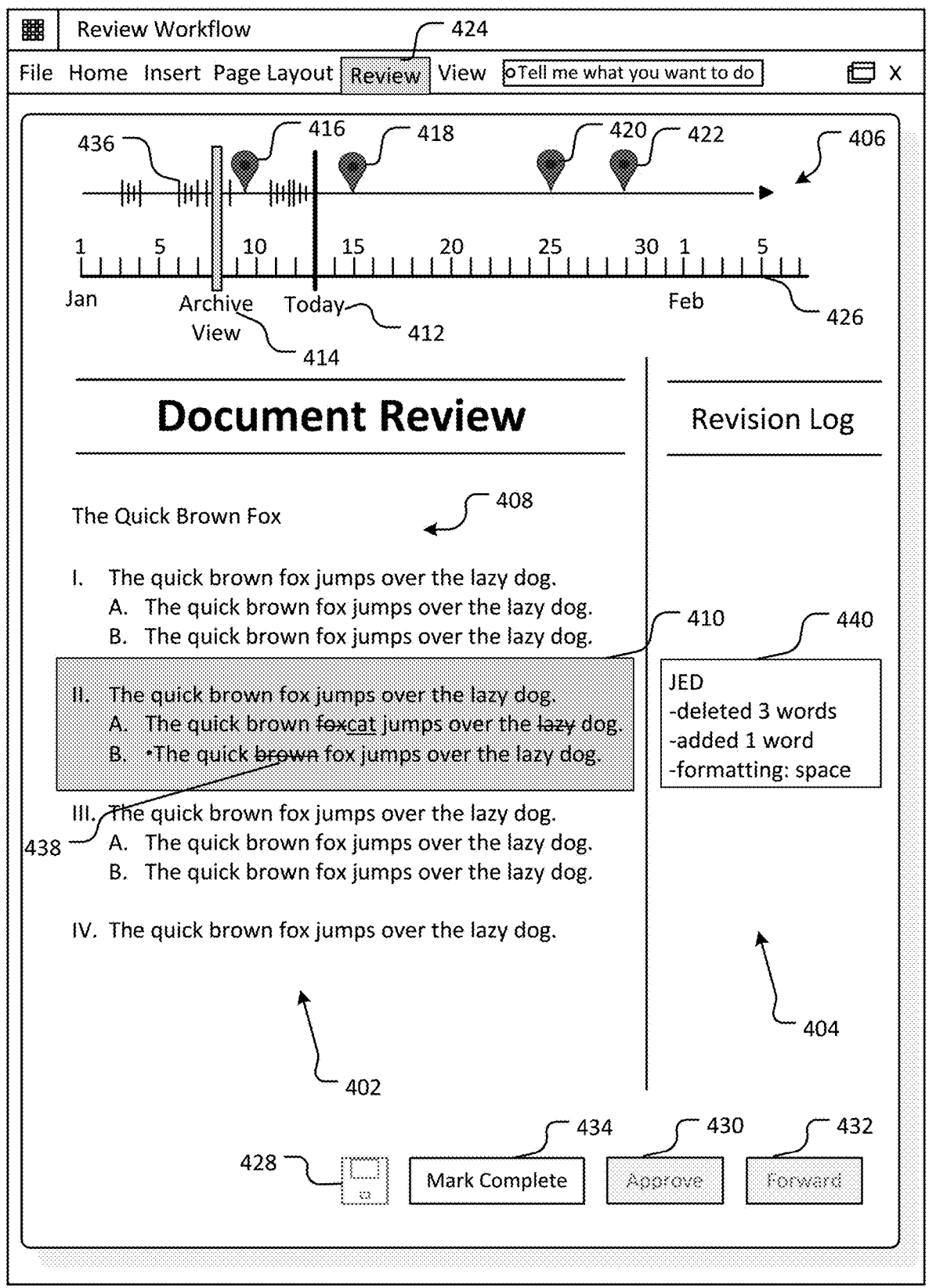
FIG. 4 illustrates an example interface associated with a review workflow associated with a section of a document.

FIG. 4 illustrates an example interface associated with a review workflow associated with a section of a document.

As detailed above, a collaborative document application may provide for generating, manipulating and/or sharing a document among coauthors, etc. In some aspects, the collaborative document application may provide a review interface 400 with one or more windows, panes, ribbons, toolbars, input fields, etc., for assigning a review workflow to one or more sections of a document 408. For example, the review interface 400 may be associated with a review tab 424 of a collaborative document interface. In other aspects, a collaborative document application may be in communication with a graphical review workflow application that provides review interface 400.

Review interface 400 may provide for reviewing and/or editing a document 408 and/or a document section 410. Additionally, review interface 400 may provide for configuring a review workflow and assigning one or more review processes to one or more process owners. In aspects, different review workflows may be configured for different sections of a document. For example, parameters for a particular review workflow assigned to a document section may be configured within the review interface 400, e.g., parameters such as permissions (read only, read/write, approval authority, etc.), one or more milestones, assigning responsibility to one or more process owners for the one or more milestones, assigning deadlines to the milestones, defining completion criteria, defining gating conditions, etc.

As illustrated, the review interface 400 includes a review pane 402, a revision log pane 404, and a review timeline 406. A document 408 is displayed in the review pane 402. In some cases, when a reviewer (e.g., process owner) has been assigned a review process for a particular document section, the review interface 400 may only display the document section assigned to the reviewer. In the illustrated case, the entire document 408 is displayed, but the assigned document section 410 is highlighted. Further, in aspects, the displayed review timeline 406 is specific to the assigned document section 410.

As further illustrated, review timeline 406 shows four milestones that have been configured for document section 410. The first milestone (e.g., milestone 416) has already passed, whereas milestone 418, milestone 420 and milestone 422 have yet to be completed. A milestone may correspond to scheduled or actual completion of any intermediate or ultimate review process associated with a review workflow. A milestone may be temporally related ("Approval by Tuesday required"), geographically related ("Approval by German division required"), organizationally related ("VP Approval required"), departmentally related ("Approval by legal required"), etc. Each milestone may be associated with a deadline, which may correspond to an explicit date and/or time (e.g., 5:00 pm, Jan. 15, 2016), an acceptable range (e.g., between Jan. 10-15, 2016), or a general time (e.g., by the end of the first fiscal quarter), etc. In some cases, deadlines for milestones may be revised in the review workflow and the timeline 406 may be updated to reflect such revisions. Completed milestones may include but are not limited to "review complete," "read complete," "approved," "localization tested," "debugged," "verified," "balanced," "reconciled," "result confirmed," and the like. In some aspects, when a milestone has been completed, an icon associated with the milestone on timeline 406 may be altered to reflect completion (e.g., may be provided in a different color, may be larger or smaller, may be faded out, etc.) (not shown). In further aspects, an icon associated with a milestone may include an indication of the process owner (e.g., responsible reviewer). For instance, the milestone icon may include a picture of the process owner, initials of the process owner, etc. (not shown). Additionally, timeline 406 may provide edit indicators 436 corresponding to edits made to the document section (e.g., document section 410) over time. In some cases, each edit indicator 436 may correspond to a single edit (e.g., edit 438), and in other cases, each edit indicator 436 may correspond to a group of edits (e.g., the group of five edits made to document section 410) received at about the same time or made by the same collaborator, etc. Further, edit indicators 436 may be selectable from timeline 406 (e.g., by clicking, hovering, touching, or otherwise) so as to provide additional information regarding an edit (e.g., author, timestamp, etc.). As illustrated, edit indicators 436 are shown as hash marks along timeline 406; however, edit indicators 436 may be identified by any suitable icon, tag, etc.

As illustrated, review timeline 406 shows a timescale 426, which includes designations for each day in the month of January and a portion of February. As should be appreciated, timescale 426 may be adjusted to provide an appropriate timescale for a particular review workflow. For instance, if the review workflow must be completed within a matter of days, timescale 426 may be provided with designations for hours; alternatively, if the review workflow must be completed within a matter of hours, timescale 426 may be provided with designations for minutes; alternatively still, if the review workflow must be completed within a year, timescale 426 may be provided with designations for months within the year. Timeline 406 may further include a current time indicator 412, which indicates the current year, month, day, time, etc., depending on the time increments on timescale 426. In this case, current time indicator 412 indicates that "today" is January 13. Timeline 406 also includes an archive time indicator 414. In this case, archive time indicator 414 has been scrolled back in time to January 8, based on timescale 426. In aspects, when archive time indicator 414 has been scrolled backward along timeline 406, an archive view of document section 410 of document 408 is displayed in review pane 402 and an archive view of revision log 440 for document section 410 is displayed in revision log pane 404.

That is, with the proper permissions, a reviewer may scroll back along timeline 406 to view prior versions of a document or document section, as well as the actual comments, revisions, etc., made to the document or document section. For instance, a current reviewer responsible for milestone 418 may scroll back along timeline 406 to a previous time, e.g., a time prior to a milestone 416, to review changes and/or comments made by a previous reviewer. As illustrated, the current reviewer is able to view edits made to document section 110 by previous reviewer "JED" at archive time January 8, as indicated by the tracked version of document section 410 and change summary in revision log 440. In some aspects, when a user is viewing an archive view of a document or document section, the user may be unable to save, approve or forward the document to another collaborator (as indicated by the grayed-out save control 428, approve control 430 and forward control 432). In other aspects, a user may be able to forward the archived document and/or save the archived document as a new document version. Additionally, a "mark complete" control 434 may be provided by review interface 400. In this case, when a process owner has finished reviewing a document or a document section, the process owner may click the mark complete control 434 in order to complete an associated milestone. In some cases, a revision of the document or document section (e.g., an incremented version) may be created when the mark complete control 434 is activated. Additionally, when the mark complete control 434 is activated, a time may be logged as a timestamp and associated with the revision and/or the associated milestone.

As should be appreciated, the various features and functionalities of review interface 400 described with respect to FIG. 4 are not intended to limit associated systems and methods to the particular features and functionalities described. Accordingly, additional features and functionalities may be included and/or some features and functionalities described may be excluded without departing from the disclosure provided herein.

Figure 5:
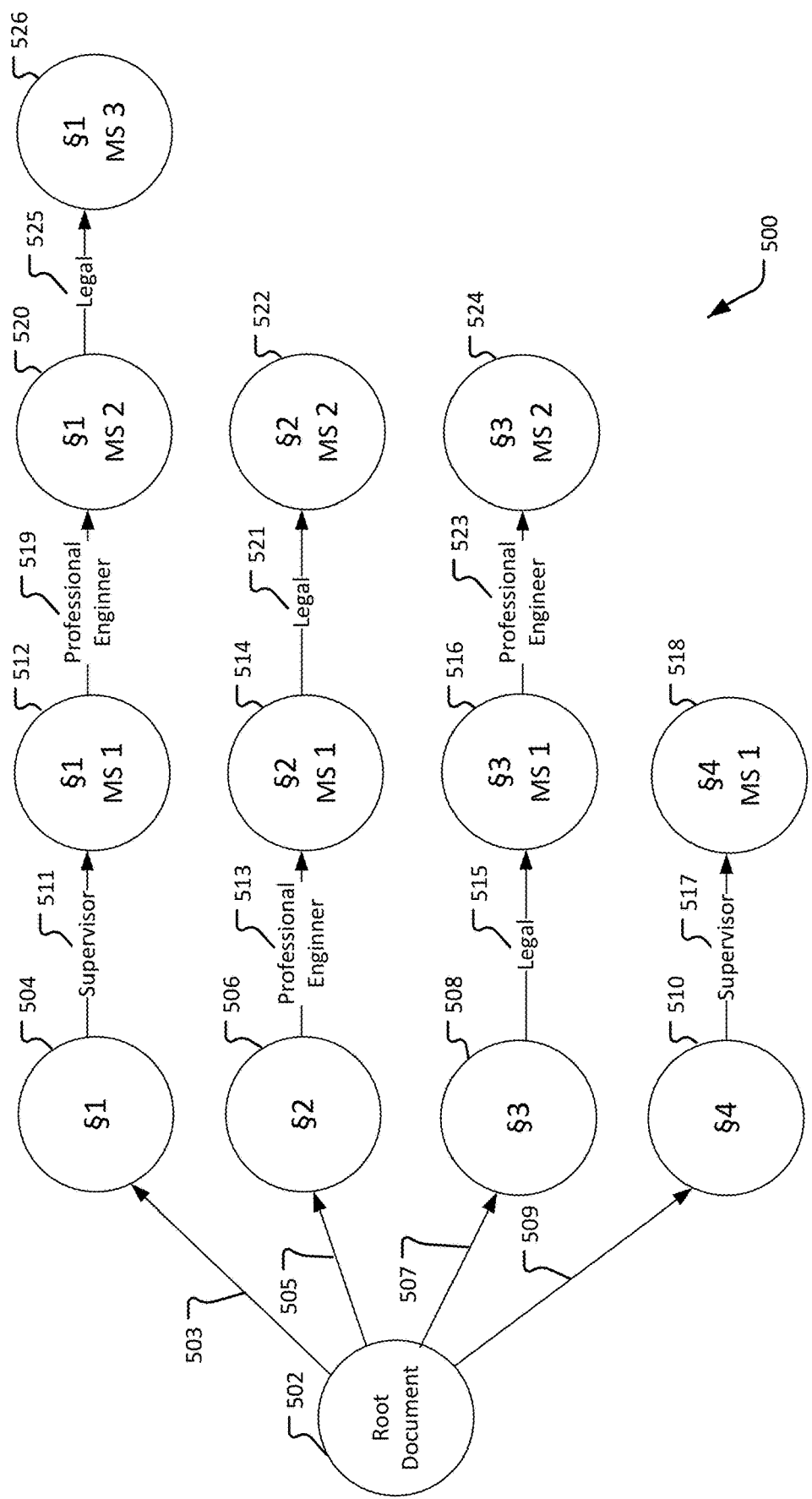
FIG. 5 depicts an example review workflow graph associated with a root document.

FIG. 5 depicts an example review workflow graph associated with a root document.

The example review workflow graph 500 comprises "nodes" 502, 504, 506, 508, 510, 512, 514, 516, 518, 520, 522, 524 and 526, and "relationships" (or "edges") 503, 505, 507, 509, 511, 513, 515, 517, 519, 521, 523 and 525. In aspects, review workflow graph 500 may be generated and/or manipulated using a graphical review workflow creation utility that may be included as part of a graphical review workflow application, as discussed above. A review interface (e.g., review interface 400) associated with the graphical review workflow application may provide for configuring a review workflow and assigning one or more review processes to one or more process owners. In aspects, different review workflows may be configured for different sections of a document. Parameters for a particular review workflow may be configured within the review interface, e.g., parameters such as permissions (read only, read/write, approval authority, etc.), one or more milestones, assigning responsibility to one or more process owners for the one or more milestones, assigning deadlines to the milestones, defining completion criteria, defining gating conditions, etc. For example, the parameters are reflected in the review workflow graph that represents the review workflow and establishes relationships to the node(s) (e.g., document sections) that will be subject to review. The context of the review workflow surrounds the grouping of the nodes that make up the document. Because the review workflow is at the node level, other documents that incorporate a particular node are able to "inherit" the results of the review (e.g., review data) and ultimate approval as well. For example, a document section associated with legal boilerplate may progress through a review workflow and, upon completion and approval, may then be added to other documents.

In aspects, the example review workflow graph 500 may be thought of as a template created by the graphical review workflow creation utility based on the parameters configured for review workflows assigned to particular document sections and one or more process owners. For example, the review workflow for a first document section (e.g., § 1) may be configured such that a supervisor is assigned a first milestone (e.g., MS 1) that entails reviewing the first document section. After the first milestone has been completed, the review workflow passes to a professional engineer who is assigned to a second milestone (e.g., MS 2) that entails reviewing the first document section that resulted from the first milestone (e.g., as reviewed/revised by the supervisor). After the second milestone has been completed, the review workflow passes to a legal professional who is assigned to a third milestone (e.g., MS 3) that entails reviewing and approving the first document section that resulted from the second milestone (e.g., as reviewed/revised by the professional engineer). Additionally, each milestone within the review workflow may be assigned a deadline for completion and gating conditions (e.g., permissions, etc.) may be established such that a prior milestone must be completed prior to starting a subsequent milestone.

In this case, the review workflow graph 500 may be generated based on the root document (e.g., node 502) and incorporate the review workflow assigned to each document section and any review data resulting from a corresponding review workflow. For example, a first relationship 503 may be established between root node 502 and node 504 (incorporating the contents of a first document section, § 1); a second relationship 505 may be established between root node 502 and node 506 (incorporating the contents of a second document section, § 2); a third relationship 507 may be established between root node 502 and node 508 (incorporating the contents of a third document section, § 3); a fourth relationship 509 may be established between root node 502 and node 510 (incorporating the contents of a fourth document section, § 4); and so on for each document section. As described above, a document section may be a paragraph, a sentence, a word, a character, a number, a cell, a range of cells, a slide, a frame, etc.

As further illustrated for the first document section (e.g., § 1) based on the review workflow described above, a relationship 511 corresponding to a review process assigned to a supervisor may be created between node 504 and node 512. Upon completion of the supervisor's review, node 512 may be created to incorporate the contents of the first document section resulting from the first milestone (MS 1) (e.g., as reviewed/revised by the supervisor). Upon completion of the first milestone, a gating condition may be satisfied and the review workflow associated with the first document section may pass to the professional engineer. In this case, a relationship 519 corresponding to a review process assigned to the professional engineer may be created between node 512 and node 520. Upon completion of the professional engineer's review, node 520 may be created to incorporate the contents of the first document section resulting from the second milestone (MS 2) (e.g., as reviewed/revised by the professional engineer). Upon completion of the second milestone, a gating condition may be satisfied and the review workflow associated with the first document section may pass to the legal professional. In this case, a relationship 525 corresponding to a review process assigned to the legal professional may be created between node 520 and node 526. Upon completion of the legal professional's review, node 526 may be created to incorporate the contents of the first document section resulting from the third milestone (MS 3) (e.g., as reviewed/revised/approved by the legal professional). That is, as illustrated for the different document sections (e.g., §§ 1-4), a review workflow graph associated with a particular document section may be created based on the review workflow assigned to the particular document section and may be different from review workflows assigned to other document sections.

As detailed above, the graphical review workflow creation utility may add the information about the review workflow to the review workflow graph 500, creating edges between the different nodes that represent the contents of the document at each stage of review. As the reviewers perform the review workflow, the system keeps track of results and/or relationships associated with the one or more review processes of the review workflow as "review data," which may include but are not limited to, for example, an edit to a document section, an approval or disapproval of a document section, a comment regarding a document section, a read status of a document section (e.g., an extent a document section has been read by a process owner), a state of a document section (e.g., complete, in-progress, not started yet, etc.), an incremented version of a document section, and the like. This information may be stored in the review workflow graph 500 with relationships to the content nodes.

As should be appreciated, the various methods, devices, components, etc., described with respect to FIG. 5 are not intended to limit the systems and methods to the particular components described. Accordingly, additional topology configurations may be used to practice the methods and systems herein and/or some components described may be excluded without departing from the methods and systems disclosed herein.

FIG. 6A depicts a first example review workflow graph associated with a document section.

The first example review workflow graph 600 comprises "nodes" 602, 604, 606, 608, 610, 612, 614, 616, 618, 620, 622 and 624, and "relationships" (or "edges") 603, 605, 607, 609, 611, 613, 615, 617, 619, 621 and 623. In aspects, similar to review workflow graph 500, review workflow graph 600 may be generated and/or manipulated using a graphical review workflow creation utility that may be included as part of a graphical review workflow application, as discussed above.

In this case, rather than illustrating the review workflow graph for an entire document, review workflow graph 600 illustrates a node cluster associated with a review workflow assigned to a first document section (e.g., § 1) corresponding to node 602. Further, rather than providing the first milestone in direct relationship to node 602 and each successive milestone in a direct relationship with a prior milestone (as illustrated by review workflow graph 500), review workflow graph 600 provides each milestone in a direct relationship with node 602, forming a node cluster related to the first document section (e.g., node 602). In this case, with reference to the review workflow assigned to the first document section above, a supervisor is assigned a first milestone (e.g., MS 1), a professional engineer is assigned to a second milestone (e.g., MS 2) and a legal professional is assigned to a third milestone (e.g., MS 3). As further provided above, each milestone may be assigned a deadline for completion and gating conditions (e.g., permissions, access rights, etc.) may be established such that a prior milestone must be completed prior to starting a subsequent milestone.

Review workflow graph 600 may incorporate both the review workflow assigned to the first document section and any review data resulting from the review workflow. In this case, node 602 may incorporate the contents of the first document section, § 1 (e.g., prior to review). Additionally, based on the review workflow described above, a relationship 603 corresponding to a review process assigned to a supervisor may be created between node 602 and node 604. Node 604 may represent a first milestone (e.g., MS 1) of the review workflow and may incorporate parameters associated with the first milestone, including deadline(s), process owner (e.g., supervisor), review criteria, etc. In connection with the supervisor's review, a relationship 605 may be generated to connect node 604 with a node 606. In aspects, when the supervisor has revised the first document section, node 606 may be generated to incorporate the contents of a first revision (e.g., Rev. 1), including additions, deletions, comments, formatting, etc., associated with the first milestone (MS 1). Alternatively, when the supervisor did not revise the first document section, no such node may be generated. In further aspects, a relationship 607 may be generated to connect node 606 with a node 608. Node 608 may contain a timestamp associated with completion of the first milestone. Additionally or alternatively (not shown), node 606 containing the first revision (e.g., Rev. 1) may be associated with a timestamp node based on the completion time of the first revision. In some cases, a timestamp may be generated in response to a "mark complete" control, as discussed above.

Upon completion of the first milestone, a gating condition may be satisfied and the review workflow associated with the first document section may pass to the professional engineer. In this case, a relationship 609 corresponding to a review process assigned to the professional engineer may be created between node 602 and node 610. Node 610 may represent a second milestone (e.g., MS 2) of the review workflow and may incorporate parameters associated with the second milestone, including deadline(s), process owner (e.g., professional engineer), review criteria, etc. In connection with the professional engineer's review, a relationship 611 may be generated to connect node 610 with a node 612. In aspects, when the professional engineer has revised the first document section, node 612 may be generated to incorporate the contents of a second revision (e.g., Rev. 2), including additions, deletions, comments, formatting, etc., associated with the second milestone (MS 2). Alternatively, when the professional engineer did not revise the first document section, no such node may be generated. In further aspects, a relationship 613 may be generated to connect node 610 with a node 614. Node 614 may contain a timestamp associated with completion of the second milestone. Additionally or alternatively (not shown), node 612 containing the second revision (e.g., Rev. 2) may be associated with a timestamp node based on the completion time of the second revision. In some cases, a timestamp may be generated in response to a "mark complete" control, as discussed above.

Upon completion of the second milestone, a gating condition may be satisfied and the review workflow associated with the first document section may pass to the legal professional. In this case, a relationship 615 corresponding to a review process assigned to the legal professional may be created between node 602 and node 616. Node 616 may represent a third milestone (e.g., MS 3) of the review workflow and may incorporate parameters associated with the third milestone, including deadline(s), process owner (e.g., legal professional), review criteria, etc. In connection with the legal professional's review, a relationship 617 may be generated to connect node 616 with a node 618. In aspects, when the legal professional has revised the first document section, node 618 may be generated to incorporate the contents of a third revision (e.g., Rev. 3), including additions, deletions, comments, formatting, etc., associated with the third milestone (MS 3). Alternatively, when the legal professional did not revise the first document section, no such node may be generated. In further aspects, a relationship 619 may be generated to connect node 618 with a node 620. Node 620 may contain a timestamp associated with completion of the third revision (e.g., Rev. 3). In some cases, a timestamp may be generated in response to a "mark complete" control, as discussed above. Furthermore, based on the review processes assigned to the legal professional, a relationship 621 may be generated to connect node 616 with a node 622. Node 622 may be generated to contain a legal approval (e.g., APPVL) for the first document section. In further aspects, a relationship 623 may be generated to connect node 622 with a node 624. Node 624 may contain a timestamp associated with completion of the legal approval (e.g., APPVL). In some cases, a timestamp may be generated in response to an "approve" control, as discussed above.

Figure 6B:
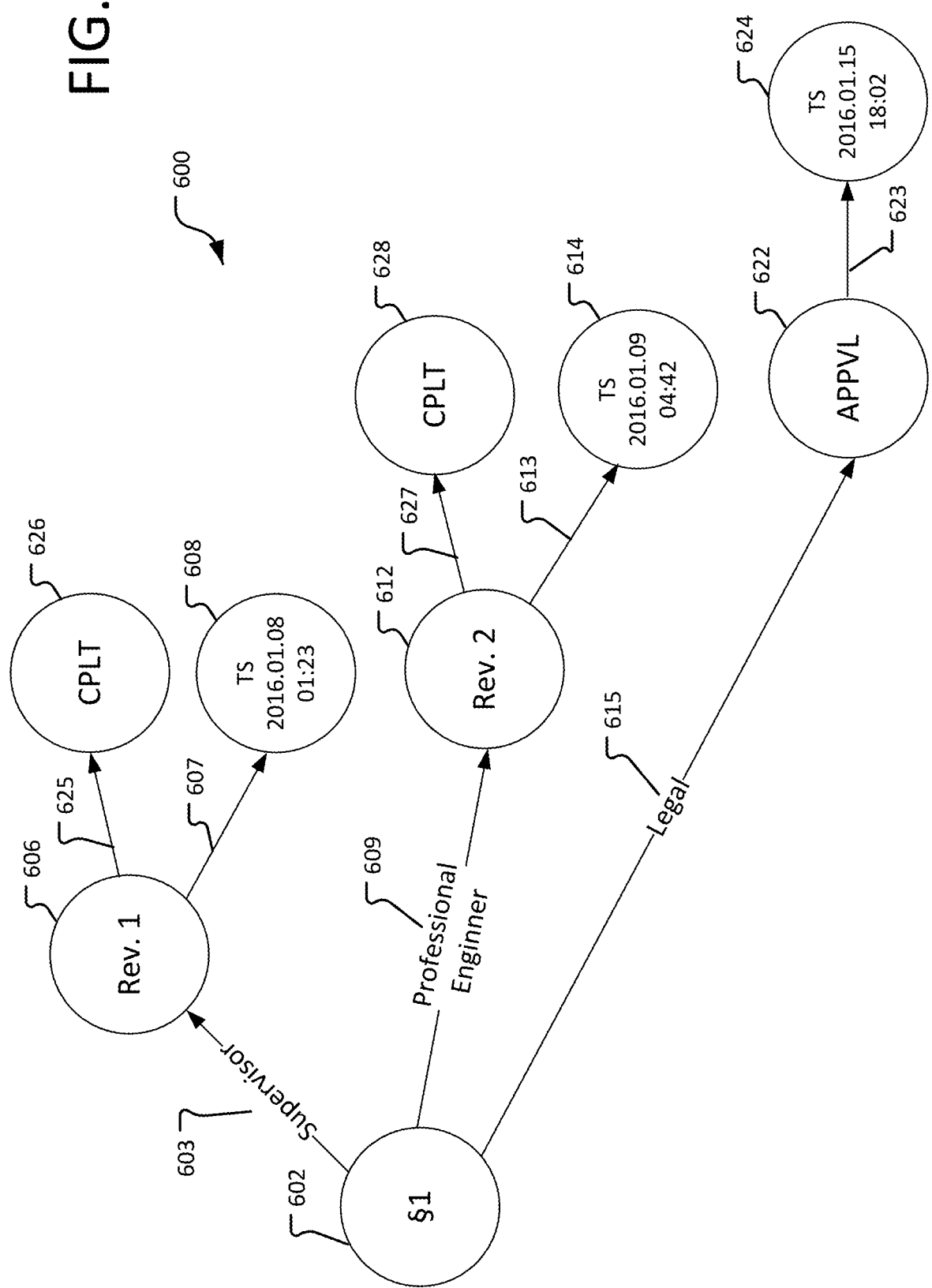
FIG. 6B depicts a second example review workflow graph associated with a document section.

FIG. 6B depicts a second example review workflow graph associated with a document section.

The second example review workflow graph 600 comprises "nodes" 602, 606, 608, 612, 614, 622, 624, 626 and 628, and "relationships" (or "edges") 603, 607, 609, 613, 615, 623, 625 and 627. As described above, review workflow graph 600 may be generated and/or manipulated using a graphical review workflow creation utility that may be included as part of a graphical review workflow application, as discussed above.

As detailed above, review workflow graph 600 illustrates a node cluster associated with a review workflow assigned to a first document section (e.g., § 1) corresponding to node 602. However, in this case, nodes representing milestones defined by the review workflow are not generated within the graph. Rather, nodes created for review data are in a direct relationship with node 602, forming a node cluster related to the first document section (e.g., node 602). In this case, with reference to the review workflow assigned to the first document section above, a supervisor is assigned review processes associated with a first milestone, a professional engineer is assigned to review processes associated with a second milestone and a legal professional is assigned to review processes associated with a third milestone. As further provided above, gating conditions (e.g., permissions, access rights, etc.) may be established such that review processes associated with a prior milestone must be completed prior to starting review processes associated with a subsequent milestone.

In the second example, review workflow graph 600 may incorporate review data resulting from the review workflow assigned to the first document section. In this case, node 602 may incorporate the contents of the first document section, § 1 (e.g., prior to review). Additionally, based on the review workflow described above, a relationship 603 corresponding to a review process assigned to a supervisor may be created between node 602 and node 606. In aspects, when the supervisor has revised the first document section, node 606 may be generated to incorporate the contents of a first revision (e.g., Rev. 1), including additions, deletions, comments, formatting, etc. Alternatively, when the supervisor did not revise the first document section, no such node may be generated. In further aspects, a relationship 607 may be generated to connect node 604 with a node 608. Node 608 may contain a timestamp associated with completion of the first revision. In further aspects, when the supervisor has completed review of the first document section, the supervisor may indicate such completion, e.g., by activating a "mark complete" control, a "complete" control, or otherwise. In this case, a relationship 625 may be generated to connect node 606 with a node 626. Node 626 may contain the complete status for the review process assigned to the supervisor. In some cases, a timestamp may be generated in response to the indication of completion, as discussed above.

Upon completion of the review process assigned to the supervisor, a gating condition may be satisfied and the review workflow associated with the first document section may pass to the professional engineer. In this case, a relationship 609 corresponding to a review process assigned to the professional engineer may be created between node 602 and node 612. In aspects, when the professional engineer has revised the first document section, node 612 may be generated to incorporate the contents of a second revision (e.g., Rev. 2), including additions, deletions, comments, formatting, etc. Alternatively, when the professional engineer did not revise the first document section, no such node may be generated. In further aspects, a relationship 613 may be generated to connect node 612 with a node 614. Node 614 may contain a timestamp associated with completion of the second revision. In further aspects, when the professional engineer has completed review of the first document section, the professional engineer may indicate such completion, e.g., by activating a "mark complete" control, a "complete" control, or otherwise. In this case, a relationship 627 may be generated to connect node 612 with a node 628. Node 628 may contain the complete status for the review process assigned to the professional engineer. In some cases, a timestamp may be generated in response to the indication of completion, as discussed above.

Upon completion of the review process assigned to the professional engineer, a gating condition may be satisfied and the review workflow associated with the first document section may pass to the legal professional. In this case, a relationship 615 corresponding to a review process assigned to the legal professional may be created between node 602 and node 622. Node 622 may be generated to contain a legal approval (e.g., APPVL) for the first document section. In further aspects, a relationship 623 may be generated to connect node 622 with a node 624. Node 624 may contain a timestamp associated with completion of the legal approval (e.g., APPVL). In some cases, a timestamp may be generated in response to an "approve" control, as discussed above.

As detailed above, the graphical review workflow creation utility may add the information about the review workflow to the review workflow graph 600 illustrated by FIG. 6A and/or FIG. 6B, creating edges between the different nodes that represent the contents of the document at each stage of review. As the reviewers perform the review workflow, the system keeps track of results and/or relationships associated with the one or more review processes of the review workflow as "review data," which may include but are not limited to, for example, an edit to a document section, an approval or disapproval of a document section, a comment regarding a document section, a read status of a document section (e.g., an extent a document section has been read by a process owner), a state of a document section (e.g., complete, in-progress, not started yet, etc.), an incremented version of a document section, and the like. This information may be stored in the review workflow graph with relationships to the content nodes.

Additionally, during the review process, the system queries over the review workflow graph and its relationships to provide status about which reviewers have completed the one or more review processes assigned to them, the states of various milestones associated with the review workflow, what percentage of the review workflow is complete, the level of comments and/or changes that have been added, and other information. The system is able to pivot a timeline of workflow tasks based on the dependencies that have been created and the state they are in (complete, not complete, etc.). The system may also materialize the document based on milestone rules. That is, the document may be reproduced such that document sections that have completed the review process may be materialized, but content that is not yet complete (e.g., reached a milestone) may not be materialized in the view. In this way, reviewers may have an idea regarding the progress of the review, the rate of completion of the document and its review, context of the content, etc. Furthermore, upon completion of the review workflow, the system may provide hints regarding correlating input from multiple reviewers and allowing a user (e.g., a "monitoring user" or "review supervisor") to see condensed feedback in the form of a hotspot document. The hotspot document could be color-coded, for example, based on an amount of feedback, edits, and so on. Such features enable the monitoring user to determine whether final document approval is complete.

As should be appreciated, the various methods, devices, components, etc., described with respect to FIGS. 6A and 6B are not intended to limit the systems and methods to the particular components described. Accordingly, additional topology configurations may be used to practice the methods and systems herein and/or some components described may be excluded without departing from the methods and systems disclosed herein.

Figure 7:
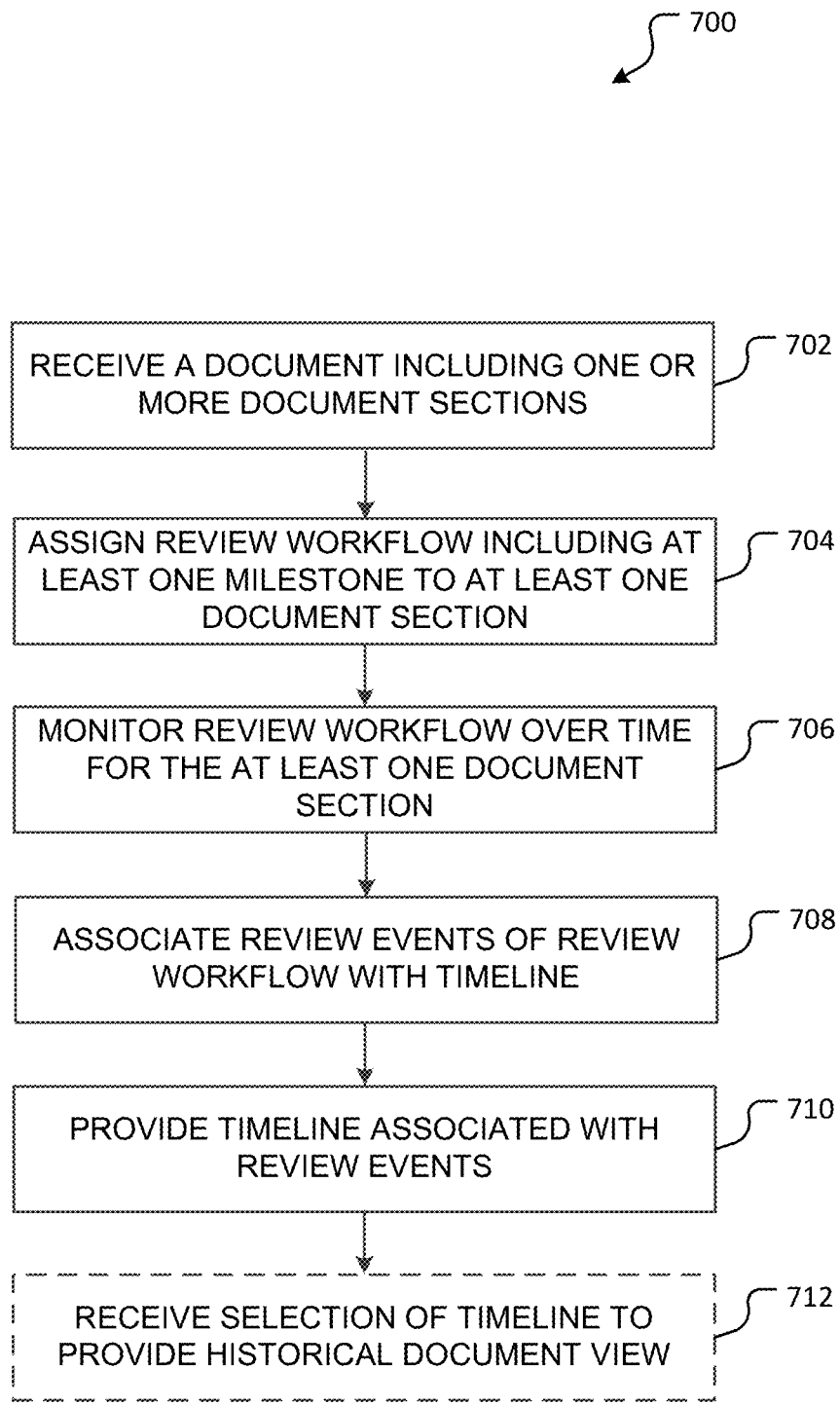
FIG. 7 illustrates an exemplary method for generating a review timeline based on a review workflow associated with one or more sections of a document.

FIG. 7 illustrates an exemplary method 700 for generating a review timeline based on a review workflow associated with one or more sections of a document.

At receive operation 702, a document including one or more document sections may be received. For instance, the document may be received by a collaborative document application and/or a graphical review workflow application. In aspects, the document may be received in response to typing on a virtual or physical keyboard, drawing on a touch-sensitive display screen (e.g., using a handwriting-to-text converter), speaking into a microphone (e.g., using a speech-to-text converter), copy/pasting from another document, and the like. Additionally, the document may include one or more document sections. As detailed above, a document may refer to any collection of data, including but not limited to a word-processing document, a workbook, a worksheet, a presentation document, a collection of code (e.g., strings, arrays, objects, etc.), a log, a report, a chart, an image, a video, etc.; and a "document section" may refer to any subset of a collection of data, including but not limited to a paragraph, a sentence, a word, a character, a number, a cell, a range of cells, a slide, a frame, etc. In at least some cases, the document may be a "collaborative document," which is any document accessible to more than one user.

At assign operation 704, a review workflow may be assigned to an entire document or one or more sections of a document. As used herein, a "review workflow" refers to one or more review processes through which one or more sections of a document pass from initiation to completion. The review workflow may further include at least one milestone, which refers to the targeted completion of one or more review processes. A milestone may further be associated with a deadline. Review processes may include, but are not limited to, reading, revising, approving, localization testing, debugging, verifying, balancing, reconciling, performance testing, proofing, formatting, typesetting, and the like. As should be appreciated, different portions of a document may require different types and levels of review. For instance, an image within a document may require a different review workflow than a chart of experimental data, which may require a different review workflow than an indemnity provision, etc. The present disclosure enables different review workflows to be applied to different sections or portions of a document.

At monitor operation 706, the review workflow may be monitored over time. As detailed above, as a review workflow progresses, the system keeps track of results and/or relationships associated with the one or more review processes of the review workflow as they occur (e.g., by logging timestamps associated with review processes). In aspects, the results and/or relationships associated with a review process may be referred to herein as "review data," which may include but are not limited to, for example, an edit to a document section, an approval or disapproval of a document section, a comment regarding a document section, a read status of a document section (e.g., an extent a document section has been read by a process owner), a state of a document section (e.g., complete, in-progress, not started yet, etc.), an incremented version of a document section, and the like. In aspects, a timestamp may be logged for each item of review data; in other aspects, timestamps may only be logged for certain types of review data (e.g., a revision, completion of a milestone, etc.) In some cases, the review data may be recorded and stored in a traditional database. Alternatively, as detailed above, a graphical review workflow creation utility may add the review data to a review workflow graph, creating edges between the different nodes that represent the contents of the document at each stage of review.

At associate operation 708, review data resulting from one or more review events may be associated with a review timeline. For instance, as described above, the review timeline may be created based on a review workflow assigned to a document or a document section. That is, the review timeline may provide a visual representation of the temporal progress of the review workflow, including intermediate milestones and deadlines as well as an ultimate completion deadline. As detailed above, a milestone may correspond to scheduled or actual completion of any intermediate or ultimate review process associated with a review workflow. Each milestone may be associated with a deadline, which may correspond to an explicit date and/or time (e.g., 5:00 pm, Jan. 15, 2016), an acceptable range (e.g., between Jan. 10-15, 2016), or a general time (e.g., by the end of the first fiscal quarter), etc. In some cases, deadlines for milestones may be revised in the review workflow and the timeline may be updated to reflect such revisions. Based on timestamps recorded for the review data, the review data may be incorporated into and accessible from the review timeline. In some cases, the review data may be associated with corresponding milestones along the review timeline. In other cases, the review data may be tagged along the review timeline at time designators corresponding to the timestamps.

At provide operation 710, the review timeline may be displayed, rendered or otherwise provided, e.g., via a user interface. In aspects, the review timeline may be specific to a particular document section and may provide access to the completion or progress of pending milestones (e.g., based on associated review data), as well as access to criteria and requirements for future milestones associated with the review workflow. In this way, stakeholders involved with the review workflow and having proper permissions may access review data associated with one or more milestones. The review data may be accessible as raw data or may be summarized, charted, or otherwise compiled in order to provide an overview of the progress of the review workflow. For instance, raw data may include but is not limited to: edits made to a document section, approvals or disapprovals of a document section, comments regarding a document section, an incremented version of a document section, etc. Summarized data may include but is not limited to graphical or derived data portraying, for example, a read status of a document section (e.g., an extent a document section has been read by a process owner), a state of a document section (e.g., complete, in-progress, not started yet, etc.), a state of the review workflow over the entire document (e.g., percent complete), a level of comments and/or changes made on a document section in comparison to other document sections or to the document as a whole, and the like.

At optional receive operation 712, a selection along the review timeline may be received. For example, as described above, milestones and/or review data may be accessible from the review timeline, e.g., by clicking, touching, gesturing or hovering over an icon associated with a milestone and/or the review data. In this way, with the proper permissions, a reviewer may scroll back along the review timeline to view prior versions of a document or document section, as well as the actual comments, edits, etc., made to the document or document section. For instance, a current reviewer responsible for a future milestone may scroll back along the review timeline to a time prior to a completed milestone to review changes and/or comments made by a previous reviewer. In some aspects, the system may materialize a historical document view and/or the current document based on milestone rules. That is, a historical document view may be displayed based on the state of the document at a selected prior time along the review timeline, e.g., based on an archived version of the document associated with a timestamp corresponding to the selected prior time. Alternatively, the current state of the document may be reproduced such that document sections that have completed the review process may be materialized, but content that is not yet complete (e.g., reached a milestone) may not be materialized in the view. In this way, reviewers may have an idea regarding the progress of the review, the rate of completion of the document and its review, context of the content, etc. Furthermore, upon ultimate completion of the review workflow, the system may provide hints regarding correlating input from multiple reviewers and allowing a user (e.g., a "monitoring user" or "review supervisor") to see condensed feedback in the form of a hotspot document. The hotspot document could be color-coded, for example, based on an amount of feedback, edits, and so on. Such features enable the monitoring user to evaluate the review workflow process and make improvements as necessary.

As should be appreciated, operations 702-712 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 8:
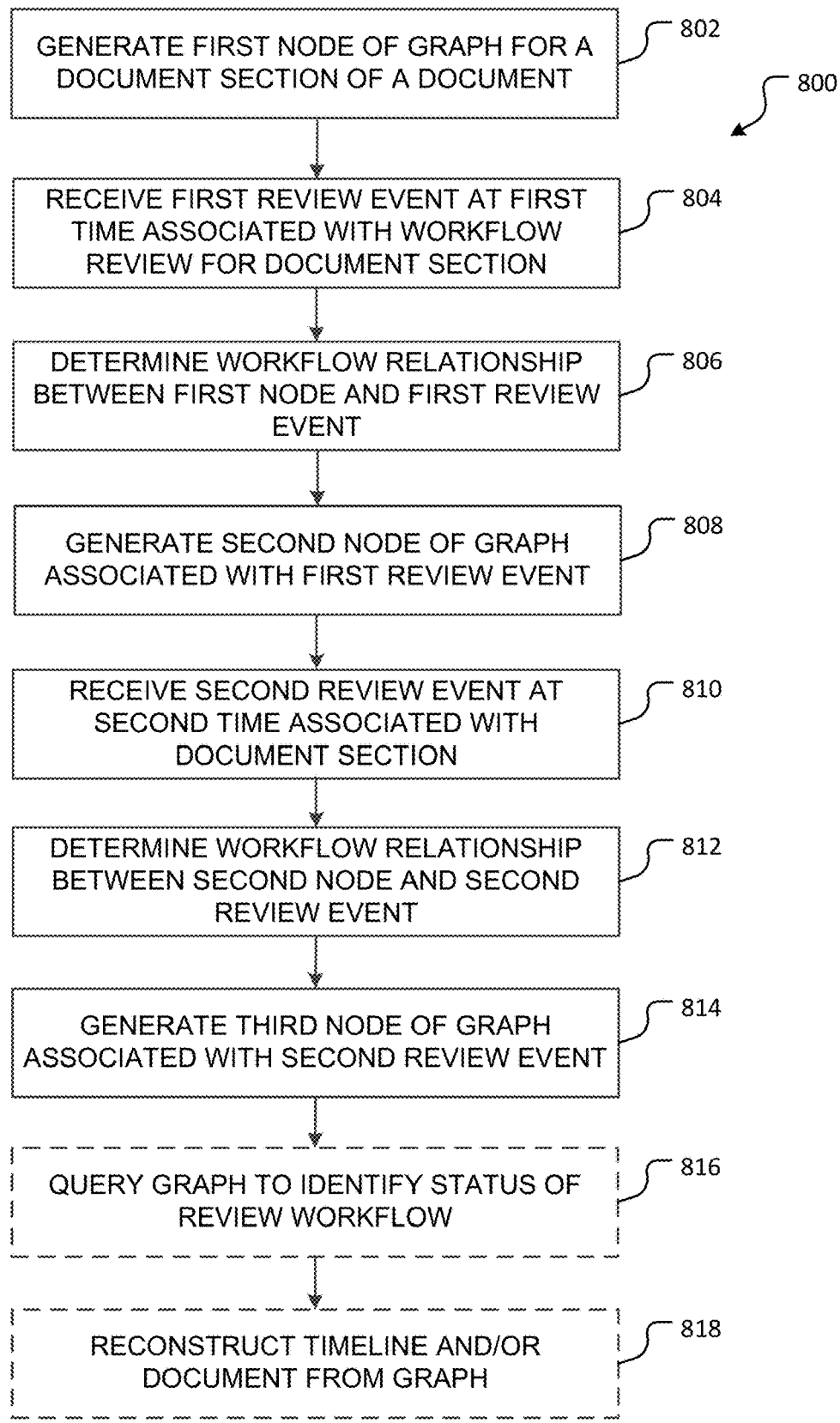
FIG. 8 illustrates a first exemplary method for generating a review workflow graph associated with a document section.

FIG. 8 illustrates a first exemplary method for generating a review workflow graph associated with a document section.

Method 800 begins with first generate operation 802 where a first node of a graph is generated for at least one document section of a document. In aspects, as described above, the first node may be generated to contain the contents of the at least one document section. As described above, a "document" refers to any collection of data, including but not limited to a word-processing document, a workbook, a worksheet, a presentation document, a collection of code (e.g., strings, arrays, objects, etc.), a log, a report, a chart, an image, a video, etc.; and a "document section" refers to any subset of a collection of data, including but not limited to a paragraph, a sentence, a word, a character, a number, a cell, a range of cells, a slide, a frame, etc. Alternatively, the first node may be created to represent a first milestone of the review workflow assigned to the at least one document section and may incorporate parameters associated with the first milestone, including deadline(s), process owner (e.g., supervisor), review criteria, etc.

At first receive operation 804, a first review event may be received at a first time. As described above, a "review workflow" may be assigned to one or more sections of a document. A review workflow refers to one or more review processes through which one or more sections of a document pass from initiation to completion. The one or more review processes may be assigned to one or more "process owners," which may include but are not limited to, for example, developers, administrators, managers, supervisors, legal personnel, engineering personnel, copy editors, automated review bots, and the like. When action is taken by a process owner on a review process, this may be referred to as a "review event" and the results and/or relationships associated with a review event may be referred to herein as "review data." Review data may include but is not limited to, for example, one or more edits to a document section, an approval or disapproval of a document section, a comment regarding a document section, a status indication (e.g., complete, in progress, not started yet, etc.) related to a review process, a read status associated with a document section, a timestamp associated with a review event, etc. In aspects, a first timestamp associated with receipt of the first review event at the first time may be associated with the review data.

At first determine relationship operation 806, a workflow relationship between the first node and the first review event may be determined. As detailed above, relationships between nodes may be referred to as "edges" within a graphical representation of the review workflow. For example, with reference to a review workflow assigned to the at least one document section, it may be determined that the first review event is associated with a review process assigned to the at least one document section and/or to a particular process owner, e.g., a supervisor, manager, legal professional, software engineer, etc. Additionally or alternatively, it may be determined that the first review event is associated with a milestone of the review workflow assigned to the at least one document section. As should be appreciated, the workflow relationship between the first node and the first review event may be determined by any suitable evaluation, including automated processing, a user indication of relatedness, or otherwise.

At second generate operation 808, a second node of a graph may be generated for the first review event. In aspects, as described above, the second node may be generated to contain the review data associated with the first review event. For example, the review data associated with the first review event may include but is not limited to, one or more edits to the at least one document section, an approval or disapproval of the at least one document section, a comment regarding the at least one document section, a completion status indication related to the at least one document section, a read status associated with the at least one document section, etc. In aspects, the determined relationship between the first review event (represented by the second node) and the first node (representing the at least one document section or a milestone) may be stored in the graph. As additional review data is received, the graph becomes more and more robust, allowing for visualization of the completion status of a review workflow and evaluation of the review workflow process.

At second receive operation 810, a second review event may be received at a second time. As described above, when action is taken by a process owner on a review process, this may be referred to as a "review event" and the results and/or relationships associated with a review event may be referred to herein as "review data." Review data may include but is not limited to, for example, one or more edits to a document section, an approval or disapproval of a document section, a comment regarding a document section, a status indication (e.g., complete, in progress, not started yet, etc.) related to a review process, a read status associated with a document section, a timestamp associated with a review event, etc. In aspects, a second timestamp associated with receipt of the second review event at the second time may be associated with the review data.

At second determine relationship operation 812, a workflow relationship between the second node and the second review event may be determined. As detailed above, relationships between nodes may be referred to as "edges" within a graphical representation of the review workflow. For example, with reference to a review workflow assigned to the at least one document section, it may be determined that the second review event is associated with a review process assigned to the at least one document section and/or to a particular process owner, e.g., a supervisor, manager, legal professional, software engineer, etc. Additionally or alternatively, it may be determined that the second review event is associated with a milestone of the review workflow assigned to the at least one document section. As should be appreciated the workflow relationship between the second node and the second review event may be determined by any suitable evaluation, including automated processing, a user indication of relatedness, or otherwise.

At third generate operation 814, a third node of a graph may be generated for the second review event. In aspects, as described above, the third node may be generated to contain the review data associated with the second review event. For example, the review data associated with the second review event may include but is not limited to, one or more edits to the at least one document section, an approval or disapproval of the at least one document section, a comment regarding the at least one document section, a completion status indication related to the at least one document section, a read status associated with the at least one document section, etc. In aspects, the determined relationship between the second review event (represented by the third node) and the second node (representing review data associated with the first review event) may be stored in the graph. As additional review data is received, the graph becomes more and more robust, allowing for visualization of the completion status of a review workflow and evaluation of the review workflow process.

At optional query operation 816, a review workflow graph associated with the generated first, second and third nodes and their determined relationships may be queried. That is, the system may query over the review workflow graph and its relationships to provide a status regarding which reviewers have completed the one or more review processes assigned to them, the states of various milestones associated with the review workflow, what percentage of the review workflow is complete, the level of comments and/or changes that have been added, and other information. Additionally, the system may pivot a timeline of the milestones and associated review events based on the dependencies that have been created and the state they are in (complete, not complete, etc.). In this way, reviewers may have an idea regarding the progress of the review workflow, the rate of completion of the document and its review, context of the content, etc.

At optional reconstruct operation 818, a review timeline associated with the document and/or the document itself may be reconstructed based on the review workflow graph. In aspects, the review timeline and/or the document may be reconstructed as described with respect to provide operation 710 and/or optional receive operation 712 described with respect to FIG. 7. In particular, the system may query over the review workflow graph and its relationships to reconstruct the review timeline and/or the document. In aspects, the system may materialize the document based on milestone rules. That is, the document may be reproduced such that document sections that have completed the review process may be materialized, but content that is not yet complete (e.g., reached a milestone) may not be materialized in the view. Furthermore, upon completion of the review workflow, the system may provide hints regarding correlating input from multiple reviewers and allowing a user (e.g., a "monitoring user" or "review supervisor") to see condensed feedback in the form of a hotspot document. The hotspot document could be color-coded, for example, based on an amount of feedback, edits, and so on. Such features enable the monitoring user to determine whether final document approval is complete.

As should be appreciated, operations 802-818 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

Figure 9:
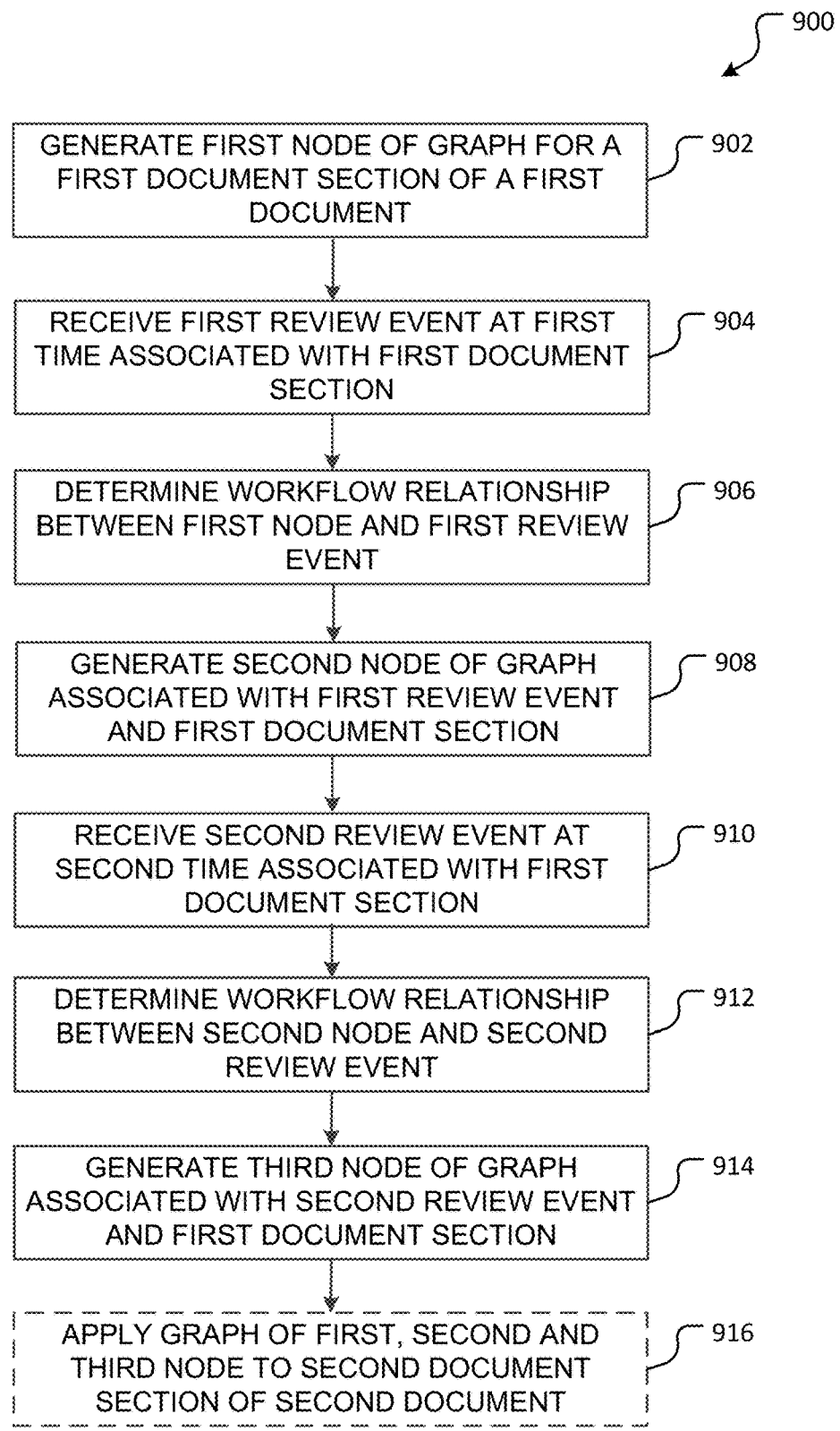
FIG. 9 illustrates a second exemplary method for generating a review workflow graph associated with a document section.

FIG. 9 illustrates a second exemplary method for generating a review workflow graph associated with a document section.

Method 900 begins with first generate operation 902, similar to first generate operation 802, where a first node of a graph is generated for a first document section of a first document. In aspects, as described above, the first node may be generated to contain the contents of the first document section.

At first receive operation 904, similar to first receive operation 804, a first review event may be received at a first time. As described above, when action is taken by a process owner on a review process, this action may be referred to as a "review event" and the results and/or relationships associated with the review event may be referred to as "review data." Review data may include but is not limited to, for example, one or more edits to a document section, an approval or disapproval of a document section, a comment regarding a document section, a status indication (e.g., complete, in progress, not started yet, etc.) related to a review process, a read status associated with a document section, a timestamp associated with a review event, etc. In aspects, a first timestamp associated with receipt of the first review event at the first time may be associated with the review data.

At first determine relationship operation 906, similar to first determine relationship operation 806, a workflow relationship between the first node and the first review event may be determined. As detailed above, relationships between nodes may be referred to as "edges" within a graphical representation of the review workflow. As should be appreciated, the workflow relationship between the first node and the first review event may be determined by any suitable evaluation, including automated processing, a user indication of relatedness, or otherwise.

At second generate operation 908, similar to second generate operation 808, a second node of a graph may be generated for the first review event. In aspects, as described above, the second node may be generated to contain the review data associated with the first review event. In aspects, the determined relationship between the first review event (represented by the second node) and the first node (representing the at least one document section or a milestone) may be stored in the graph.

At second receive operation 910, similar to second receive operation 810, a second review event may be received at a second time. As described above, when action is taken by a process owner on a review process, this action may be referred to as a "review event" and the results and/or relationships associated with the review event may be referred to as "review data." In aspects, a first timestamp associated with receipt of the first review event at the first time may be associated with the review data.

At second determine relationship operation 912, similar to second determine relationship operation 812, a relationship between the second node and the second review event may be determined. As detailed above, relationships between nodes may be referred to as "edges" within a graphical representation of the review workflow. As should be appreciated the workflow relationship between the second node and the second review event may be determined by any suitable evaluation, including automated processing, a user indication of relatedness, or otherwise.

At third generate operation 914, similar to third generate operation 814, a third node of a graph may be generated for the second review event. In aspects, as described above, the third node may be generated to contain the review data associated with the second review event. In aspects, the determined relationship between the second review event (represented by the third node) and the second node (representing review data associated with the first review event) may be stored in the graph.

At optional apply operation 916, a review workflow graph associated with the generated first, second and third nodes and their determined relationships may be applied to a second document section of a second document. That is, because the review workflow is generated at the node level, other documents that incorporate a particular node are able to "inherit" the results of the review (e.g., review data) and ultimate approval as well. For example, the first document section may be associated with legal boilerplate and may progress through a review workflow (e.g., resulting in generation of the first, second and third nodes along with their relationships). Upon completion and approval, the generated review workflow graph may then be added to a second document, e.g., to a second document section associated with the same legal boilerplate.

As should be appreciated, operations 902-916 are described for purposes of illustrating the present methods and systems and are not intended to limit the disclosure to a particular sequence of steps, e.g., steps may be performed in differing order, additional steps may be performed, and disclosed steps may be excluded without departing from the present disclosure.

FIGS. 10-13 and the associated descriptions provide a discussion of a variety of operating environments in which aspects of the technology may be practiced. However, the devices and systems illustrated and discussed with respect to FIGS. 10-13 are for purposes of example and illustration and are not limiting of a vast number of computing device configurations that may be utilized for practicing aspects of the disclosure, described herein.

Figure 10:
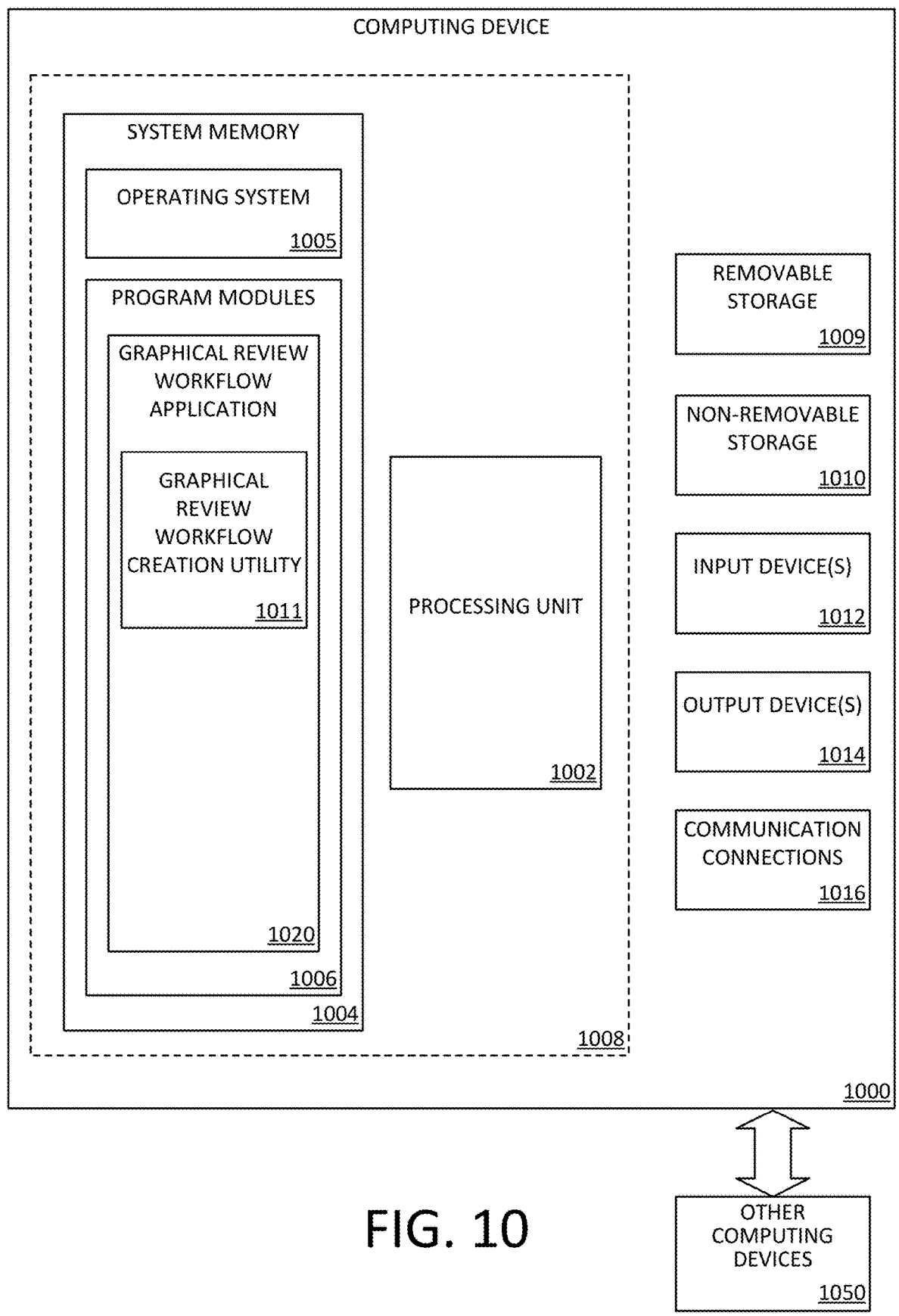
FIG. 10 depicts a block diagram illustrating example physical components of a computing device with which aspects of the disclosure may be practiced.

FIG. 10 is a block diagram illustrating physical components (e.g., hardware) of a computing device 1000 with which aspects of the disclosure may be practiced. The computing device components described below may be suitable for the computing devices described above, including the client computing devices 102A-C and the server computing devices 106A-C. In a basic configuration, the computing device 1000 may include at least one processing unit 1002 and a system memory 1004. Depending on the configuration and type of computing device, the system memory 1004 may comprise, but is not limited to, volatile storage (e.g., random access memory), non-volatile storage (e.g., read-only memory), flash memory, or any combination of such memories. The system memory 1004 may include an operating system 1005 and one or more program modules 1006 suitable for running graphical review workflow application 1020, such as one or more components supported by the systems described herein. As examples, system memory 1004 may store a review workflow and/or review data (e.g., results and/or relationships associated with the one or more review processes assigned to a document and/or a document section, etc.). The operating system 1005, for example, may be suitable for controlling the operation of the computing device 1000. Furthermore, embodiments of the disclosure may be practiced in conjunction with a graphics library, other operating systems, or any other application program and is not limited to any particular application or system. This basic configuration is illustrated in FIG. 10 by those components within a dashed line 1008. The computing device 1000 may have additional features or functionality. For example, the computing device 1000 may also include additional data storage devices (removable and/or non-removable) such as, for example, magnetic disks, optical disks, or tape. Such additional storage is illustrated in FIG. 10 by a removable storage device 1009 and a non-removable storage device 1010.

As stated above, a number of program modules and data files may be stored in the system memory 1004. While executing on the processing unit 1002, the program modules 1006 (e.g., graphical review workflow application 1020 and associated graphical review workflow creation utility 1011) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, collaborative document applications, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 10 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 1000 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 1000 may also have one or more input device(s) 1012 such as a keyboard, a mouse, a pen, a sound or voice input device, a touch or swipe input device, etc. The output device(s) 1014 such as a display, speakers, a printer, etc. may also be included. The aforementioned devices are examples and others may be used. The computing device 1000 may include one or more communication connections 1016 allowing communications with other computing devices 1050. Examples of suitable communication connections 1016 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 1004, the removable storage device 1009, and the non-removable storage device 1010 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1000. Any such computer storage media may be part of the computing device 1000. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 11A:
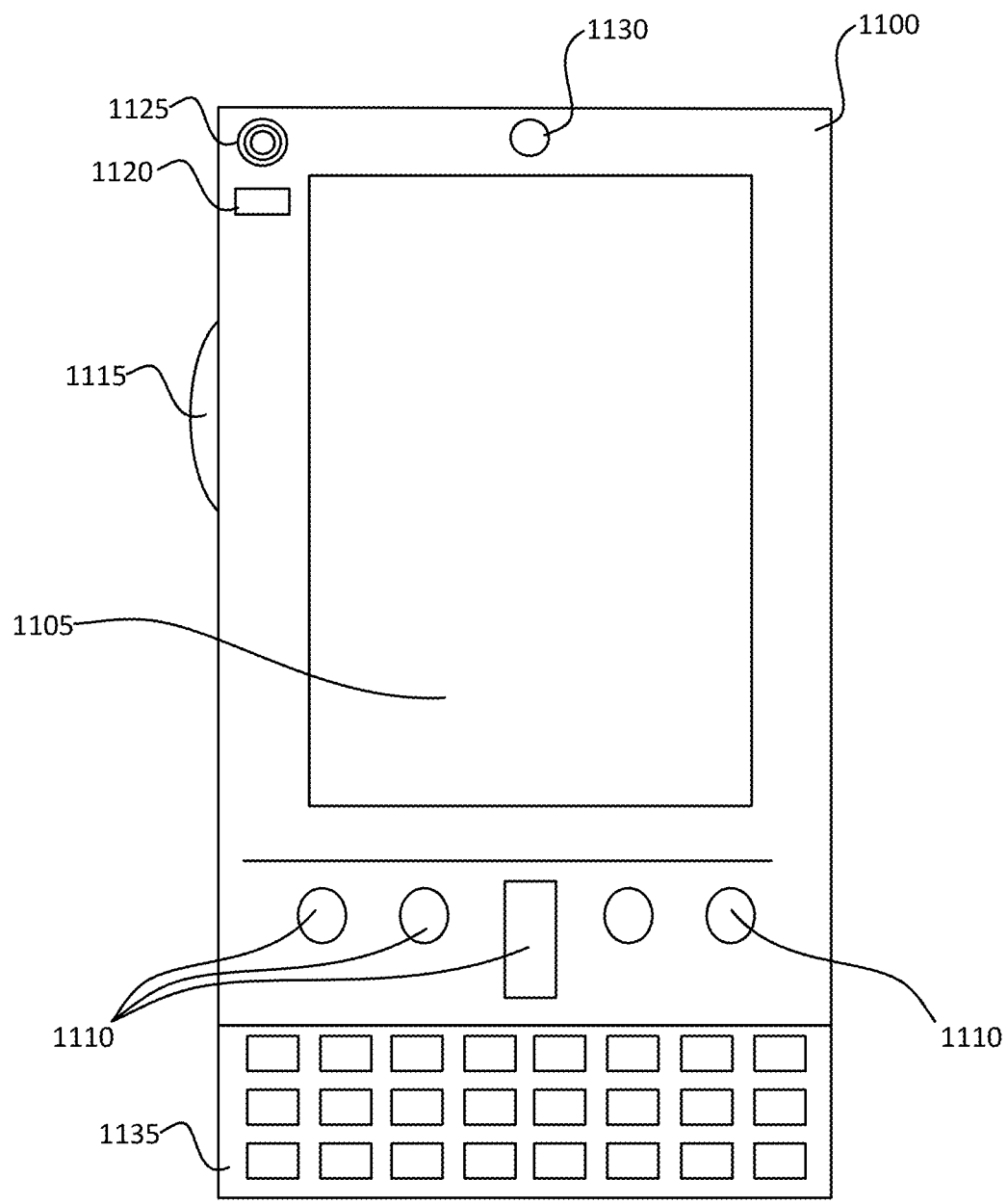
FIGS. 11A and 11B depict simplified block diagrams of a mobile computing device with which aspects of the present disclosure may be practiced.
Figure 11B:
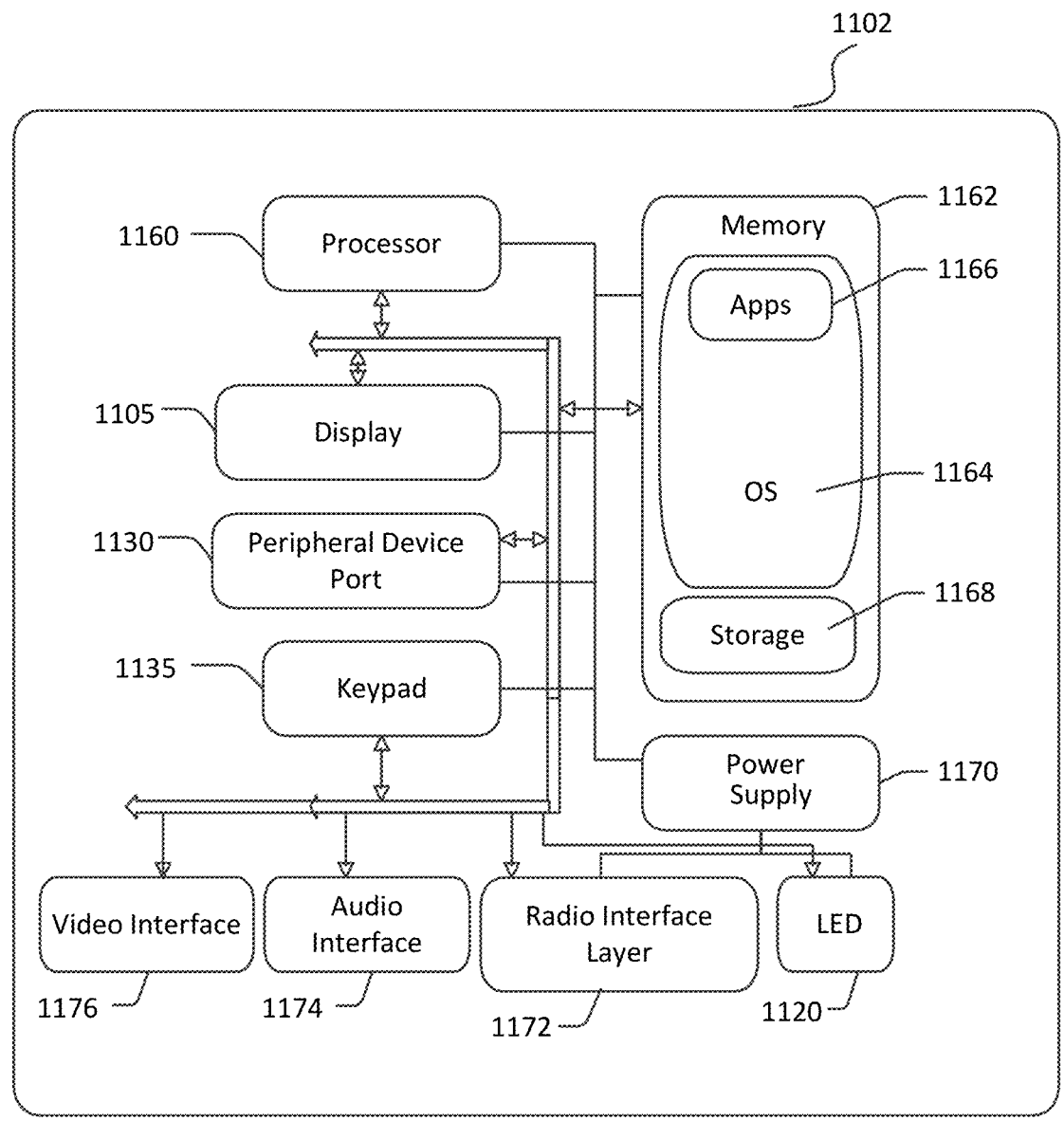

FIGS. 11A and 11B illustrate a mobile computing device 1100, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 11A, one aspect of a mobile computing device 1100 for implementing the aspects is illustrated. In a basic configuration, the mobile computing device 1100 is a handheld computer having both input elements and output elements. The mobile computing device 1100 typically includes a display 1105 and one or more input buttons 1110 that allow the user to enter information into the mobile computing device 1100. The display 1105 of the mobile computing device 1100 may also function as an input device (e.g., a touch screen display). If included, an optional side input element 1115 allows further user input. The side input element 1115 may be a rotary switch, a button, or any other type of manual input element. In alternative aspects, mobile computing device 1100 may incorporate more or less input elements. For example, the display 1105 may not be a touch screen in some embodiments. In yet another alternative embodiment, the mobile computing device 1100 is a portable phone system, such as a cellular phone. The mobile computing device 1100 may also include an optional keypad 1135. Optional keypad 1135 may be a physical keypad or a "soft" keypad generated on the touch screen display. In various embodiments, the output elements include the display 1105 for showing a graphical user interface (GUI), a visual indicator 1120 (e.g., a light emitting diode), and/or an audio transducer 1125 (e.g., a speaker). In some aspects, the mobile computing device 1100 incorporates a vibration transducer for providing the user with tactile feedback. In yet another aspect, the mobile computing device 1100 incorporates input and/or output ports, such as an audio input (e.g., a microphone jack), an audio output (e.g., a headphone jack), and a video output (e.g., a HDMI port) for sending signals to or receiving signals from an external device.

FIG. 11B is a block diagram illustrating the architecture of one aspect of a mobile computing device. That is, the mobile computing device 1100 can incorporate a system (e.g., an architecture) 1102 to implement some aspects. In one embodiment, the system 1102 is implemented as a "smart phone" capable of running one or more applications (e.g., browser, e-mail, calendaring, contact managers, messaging clients, games, and media clients/players). In some aspects, the system 1102 is integrated as a computing device, such as an integrated personal digital assistant (PDA) and wireless phone.

One or more application programs 1166 may be loaded into the memory 1162 and run on or in association with the operating system 1164. Examples of the application programs include phone dialer programs, e-mail programs, personal information management (PIM) programs, word processing programs, spreadsheet programs, Internet browser programs, messaging programs, and so forth. The system 1102 also includes a non-volatile storage area 1168 within the memory 1162. The non-volatile storage area 1168 may be used to store persistent information that should not be lost if the system 1102 is powered down. The application programs 1166 may use and store information in the non-volatile storage area 1168, such as e-mail or other messages used by an e-mail application, and the like. A synchronization application (not shown) also resides on the system 1102 and is programmed to interact with a corresponding synchronization application resident on a host computer to keep the information stored in the non-volatile storage area 1168 synchronized with corresponding information stored at the host computer. As should be appreciated, other applications may be loaded into the memory 1162 and run on the mobile computing device 1100, including the instructions for providing an interface for providing a review timeline as described herein.

The system 1102 has a power supply 1170, which may be implemented as one or more batteries. The power supply 1170 may further include an external power source, such as an AC adapter or a powered docking cradle that supplements or recharges the batteries.

The system 1102 may also include a radio interface layer 1172 that performs the function of transmitting and receiving radio frequency communications. The radio interface layer 1172 facilitates wireless connectivity between the system 1102 and the "outside world," via a communications carrier or service provider. Transmissions to and from the radio interface layer 1172 are conducted under control of the operating system 1164. In other words, communications received by the radio interface layer 1172 may be disseminated to the application programs 1166 via the operating system 1164, and vice versa.

The visual indicator 1120 may be used to provide visual notifications, and/or an audio interface 1174 may be used for producing audible notifications via an audio transducer 1125 (e.g., audio transducer 1125 illustrated in FIG. 11A). In the illustrated embodiment, the visual indicator 1120 is a light emitting diode (LED) and the audio transducer 1125 may be a speaker. These devices may be directly coupled to the power supply 1170 so that when activated, they remain on for a duration dictated by the notification mechanism even though the processor 1160 and other components might shut down for conserving battery power. The LED may be programmed to remain on indefinitely until the user takes action to indicate the powered-on status of the device. The audio interface 1174 is used to provide audible signals to and receive audible signals from the user. For example, in addition to being coupled to the audio transducer 1125, the audio interface 1174 may also be coupled to a microphone to receive audible input, such as to facilitate a telephone conversation. In accordance with embodiments of the present disclosure, the microphone may also serve as an audio sensor to facilitate control of notifications, as will be described below. The system 1102 may further include a video interface 1176 that enables an operation of peripheral device 1130 (e.g., on-board camera 1130 of FIG. 11A) to record still images, video stream, and the like.

A mobile computing device 1100 implementing the system 1102 may have additional features or functionality. For example, the mobile computing device 1100 may also include additional data storage devices (removable and/or non-removable) such as, magnetic disks, optical disks, or tape. Such additional storage is illustrated in FIG. 11B by the non-volatile storage area 1168.

Data/information generated or captured by the mobile computing device 1100 and stored via the system 1102 may be stored locally on the mobile computing device 1100, as described above, or the data may be stored on any number of storage media that may be accessed by the device via the radio interface layer 1172 or via a wired connection between the mobile computing device 1100 and a separate computing device associated with the mobile computing device 1100, for example, a server computer in a distributed computing network, such as the Internet. As should be appreciated such data/information may be accessed via the mobile computing device 1100 via the radio interface layer 1172 or via a distributed computing network. Similarly, such data/information may be readily transferred between computing devices for storage and use according to well-known data/information transfer and storage means, including electronic mail and collaborative data/information sharing systems.

As should be appreciated, FIGS. 11A and 11B are described for purposes of illustrating the present methods and systems and are not intended to limit the disclosure to a particular sequence of steps or a particular combination of hardware or software components.

Figure 12:
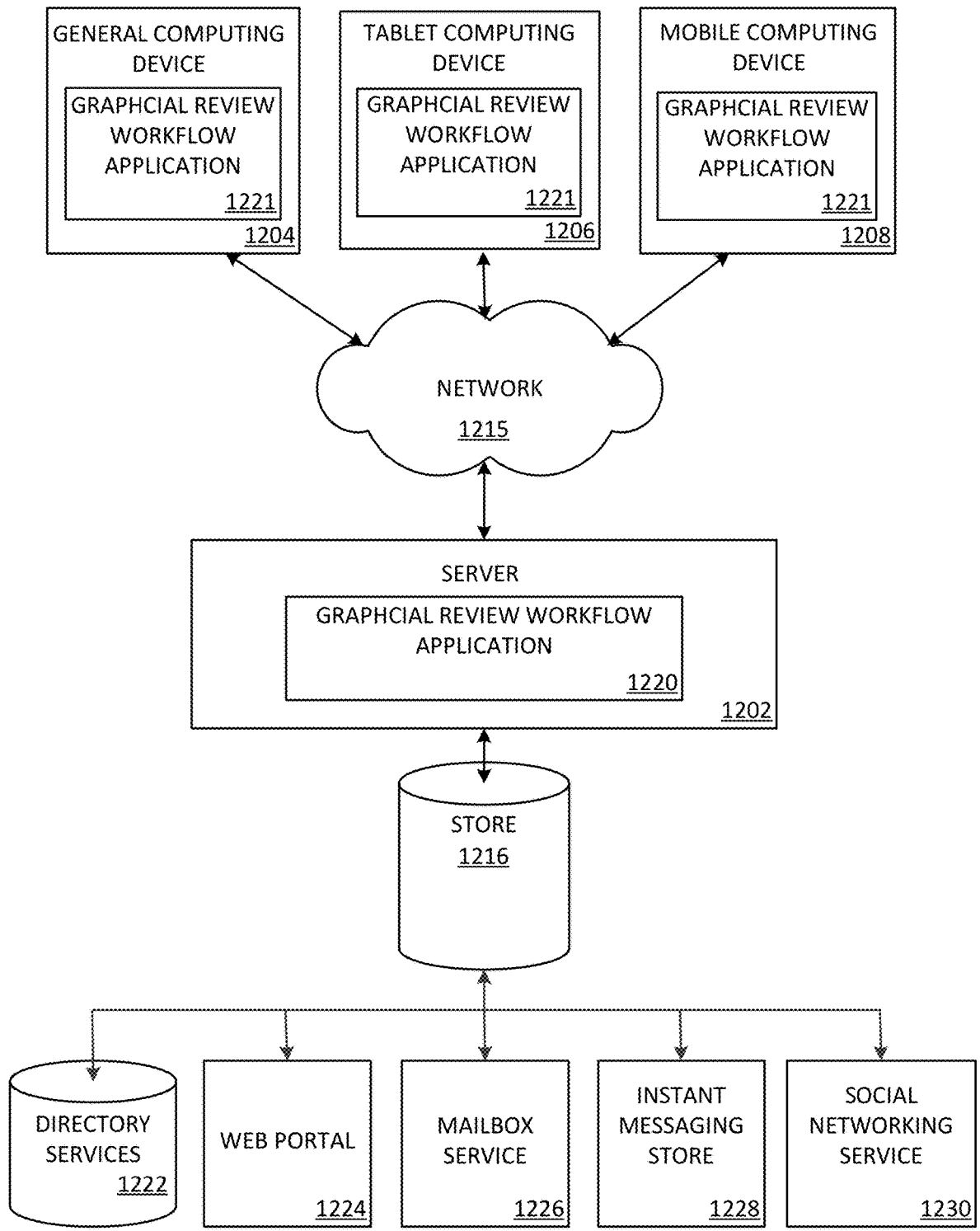
FIG. 12 depicts a simplified block diagram of a distributed computing system in which aspects of the present disclosure may be practiced.

FIG. 12 illustrates one aspect of the architecture of a system for processing data received at a computing system from a remote source, such as a general computing device 1204 (e.g., personal computer), tablet computing device 1206, or mobile computing device 1208, as described above. Content displayed at server device 1202 may be stored in different communication channels or other storage types. For example, various documents may be stored using a directory service 1222, a web portal 1224, a mailbox service 1226, an instant messaging store 1228, or a social networking service 1230. The graphical review workflow application 1221 may be employed by a client that communicates with server device 1202, and/or the graphical review workflow application 1220 may be employed by server device 1202. The server device 1202 may provide data to and from a client computing device such as a general computing device 1204, a tablet computing device 1206 and/or a mobile computing device 1208 (e.g., a smart phone) through a network 1215. By way of example, the computer system described above with respect to FIGS. 1-11 may be embodied in a general computing device 1204 (e.g., personal computer), a tablet computing device 1206 and/or a mobile computing device 1208 (e.g., a smart phone). Any of these embodiments of the computing devices may obtain content from the store 1216, in addition to receiving graphical data useable to either be pre-processed at a graphic-originating system or post-processed at a receiving computing system.

As should be appreciated, FIG. 12 is described for purposes of illustrating the present methods and systems and is not intended to limit the disclosure to a particular sequence of steps or a particular combination of hardware or software components.

Figure 13:
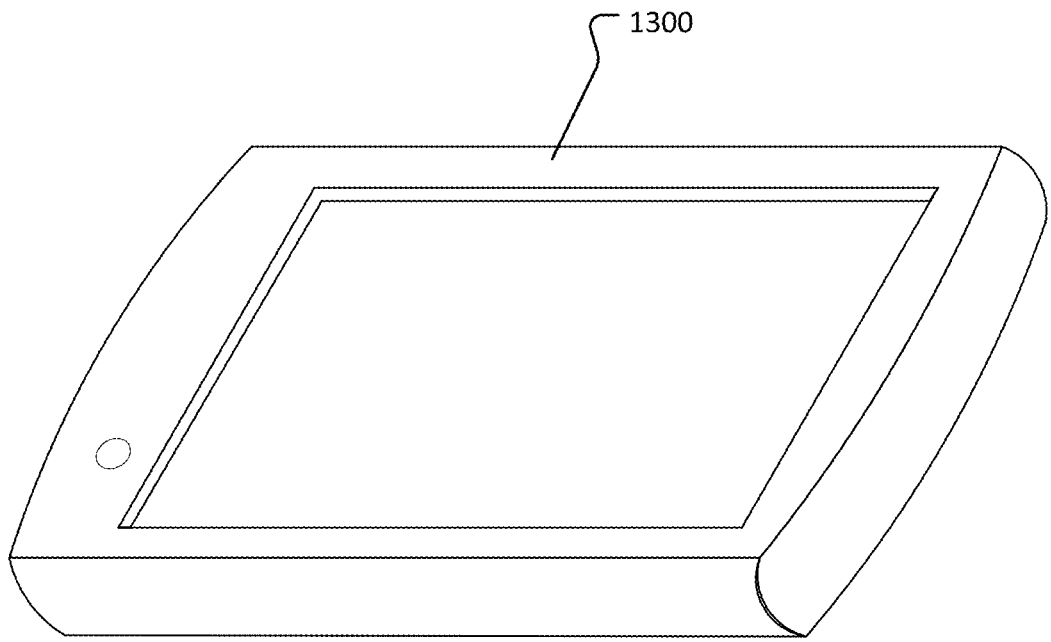
FIG. 13 depicts a tablet computing device for executing one or more aspects of the present disclosure.

FIG. 13 illustrates an exemplary tablet computing device 1300 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As should be appreciated, FIG. 13 is described for purposes of illustrating the present methods and systems and is not intended to limit the disclosure to a particular sequence of steps or a particular combination of hardware or software components.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Further, while multiple examples and embodiments have been discussed herein, it should be understood that features from one example may be combined with features from any other example. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   at least one processor; and
   at least one memory storing instructions that when executed by the at least one processor cause the system to perform a set of operations comprising:
   assigning a first review workflow to a first document section of a document by creating a first relationship between the first review workflow and the first document section within a graph, wherein the first document section is a subset of the document, and wherein the first review workflow comprises at least a first milestone;
   assigning a second review workflow to a second document section of the document by creating a second relationship between the second review workflow and the second document section within the graph, wherein the second document section is a different subset of the document, and wherein the second review workflow comprises at least a second milestone, and wherein the second milestone is different from the first milestone;
   monitoring the first review workflow and the second review workflow over time, wherein the first review workflow is associated with one or more first review events and the second review workflow is associated with one or more second review events, wherein the one or more first review events are associated with completion of the first milestone, and wherein the one or more second review events are associated with completion of the second milestone;
   associating at least one first review event for the first review workflow and at least one second review event for the second review workflow with a timeline; and
   providing the timeline.

2. The system of claim 1, further comprising:
   associating at least the first milestone and the second milestone with the timeline.

3. The system of claim 1, further comprising:
   receiving a selection of the timeline; and
   providing review data associated with one of the at least one first review event or the at least one second review event.

4. The system of claim 1, further comprising:
   scrolling back in time along the timeline; and
   providing a historical view of the first document section or the second document section.

5. The system of claim 1, further comprising:
   generating a first node of a graph, wherein the first node comprises content of the first document section or the second document section;
   generating a second node of the graph, wherein the second node comprises review data associated with one of the at least one first review event or the at least one second review event; and
   determining a relationship between the first node and the second node in the graph.

6. The system of claim 5, wherein the monitoring further comprises:
   receiving a timestamp associated with one of the at least one first review event or the at least one second review event; and
   associating the timestamp with the second node of the graph.

7. The system of claim 6, further comprising:
   querying the graph to identify a status of the first review workflow or the second review workflow; and
   providing the status of the first review workflow or the second review workflow associated with the first document section or the second document section.

8. A computer-implemented method for generating a graph of a review workflow assigned to at least one section of a document, the method comprising:
   generating a first node of a graph, wherein the first node comprises content of the at least one document section;
   receiving a review event, wherein the review event is associated with a review workflow assigned to the at least one document section;
   generating a second node of the graph, wherein the second node comprises review data associated with the review event;
   based at least in part on the review workflow, determining a relationship between the first node and the second node of the graph; and
   querying the graph to identify a status of the review workflow.

9. The computer-implemented method of claim 8, wherein the review event is associated with a timestamp.

10. The computer-implemented method of claim 9, further comprising:
    associating the timestamp with the second node of the graph.

11. The computer-implemented method of claim 10, further comprising:
    providing a timeline of the review workflow assigned to the at least one document section.

12. The computer-implemented method of claim 11, further comprising:
    receiving a selection of the timeline; and
    providing review data associated with the at least one review event.

13. The computer-implemented method of claim 11, further comprising:
    scrolling back in time along the timeline; and
    providing a historical view of the at least one document section.

14. The computer-implemented method of claim 9, further comprising:
    based at least in part on the status of the review workflow, reconstructing the document.

15. A computer storage medium comprising computer-executable instructions that when executed by a processor perform a method for generating a graph of a review workflow assigned to at least one section of a document, the method comprising:
    generating a first node of a graph, wherein the first node comprises content of the at least one document section;
    receiving a review event at a first time, wherein the review event is associated with a review workflow assigned to the at least one document section;
    generating a second node of the graph, wherein the second node comprises the first time and review data associated with the review event;
    based at least in part on the review workflow, determining a relationship between the first node and the second node of the graph; and querying the graph to generate a timeline of the review workflow assigned to the at least one document section.

16. The computer storage medium of claim 15, further comprising:
receiving a selection of the timeline; and
providing review data associated with the at least one review event.

17. The computer storage medium of claim 15, further comprising:
scrolling back in time along the timeline; and
providing a historical view of the at least one document section.

18. The computer storage medium of claim 15, further comprising:
querying the graph to identify a status of the review workflow.

19. The computer storage medium of claim 18, further comprising:
based at least in part on the status of the review workflow, reconstructing the document.

20. The system of claim 1, wherein the first milestone is one of: temporally related to the first review workflow, geographically related to the first review workflow, or departmentally related to the first review workflow.

* * * * *